(12) United States Patent
Khattab et al.

(10) Patent No.: US 11,954,793 B2
(45) Date of Patent: Apr. 9, 2024

(54) SYSTEMS AND METHODS FOR THREE-DIMENSIONAL FACIES MODEL GENERATION

(71) Applicant: Saudi Arabian Oil Company, Dhahran (SA)

(72) Inventors: Sherif Khattab, Dhahran (SA); Muhammad Ashraf, Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 203 days.

(21) Appl. No.: 17/682,112

(22) Filed: Feb. 28, 2022

(65) Prior Publication Data

US 2023/0274497 A1 Aug. 31, 2023

(51) Int. Cl.
| | | |
|---|---|---|
| G06T 17/00 | (2006.01) | |
| G01V 99/00 | (2009.01) | |
| G06T 3/40 | (2006.01) | |
| G06T 11/20 | (2006.01) | |
| G06V 20/10 | (2022.01) | |

(52) U.S. Cl.
CPC ............ G06T 17/00 (2013.01); G01V 99/005 (2013.01); G06T 3/40 (2013.01); G06T 11/206 (2013.01); G06V 20/10 (2022.01)

(58) Field of Classification Search
CPC ......... G06T 11/206; G06T 17/00; G06T 3/40; G06V 20/10; G01V 99/005
See application file for complete search history.

(56) References Cited

U.S. PATENT DOCUMENTS 7,054,753 B1 5/2006 Williams et al.
2015/0009215 A1 1/2015 Vallikkat Thachaparambil et al.

*Primary Examiner* — Michelle L Sams
(74) *Attorney, Agent, or Firm* — Dinsmore & Shohl LLP

(57) ABSTRACT

A 3D facies model generator system and methods thereof include a processor and repository comprising (i) facies data, (ii) sequence stratigraphy, and (iii) a depositional model for a subject reservoir. The processor is operable to generate a 3D stratigraphic sequence framework comprising a plurality of facies based on received facies data and sequence stratigraphy, generate a facies volume fraction for each facies, compare each facies volume fraction with the depositional model for the subject reservoir, reassign the facies volume fraction for the facies of the plurality of facies to another facies of the plurality of facies when the comparison determines that the facies of the 3D stratigraphic sequence framework is incorrectly assigned, generate a plurality of 3D probability trends for the plurality of facies based on the facies volume fraction for the respective facies, and generate the 3D facies model based on the 3D probability trends.

20 Claims, 16 Drawing Sheets

Well logs statistics:

| Code | | Name | % | N | Intervals | Min | Max | Std |
|---|---|---|---|---|---|---|---|---|
| 2 | ☒ | Mudstone/Bioturbated... | 19.74 | 24084 | 2602 | 0.0 | 29.3 | 2.037 |
| 4 | ☐ | Rudstone-Oncloiite | 27.63 | 24704 | 3059 | 0.4 | 37.0 | 2.829 |
| 7 | ☒ | Stromatoporoids | 9.44 | 9528 | 1902 | 0.5 | 23.0 | 1.536 |
| 10 | ☒ | Cladocoropsis | 25.49 | 22511 | 3693 | 0.4 | 36.0 | 2.013 |
| 12 | ☒ | Peloid-skeletal packston... | 13.98 | 11718 | 2780 | 0.0 | 78.5 | 1.93 |
| 13 | ☐ | Ooid-coated grains | 3.72 | 2536 | 536 | 0.5 | 38.0 | 2.792 |

FIG. 8

SYSTEMS AND METHODS FOR THREE-DIMENSIONAL FACIES MODEL GENERATION

BACKGROUND

The present disclosure relates to facies model generation and, more specifically, systems and methods for three-dimensional facies model generation.

BRIEF SUMMARY

According to the subject matter of the present disclosure, a three-dimensional (3D) facies model generator system comprising a 3D facies model memory comprising a model generator component and a facies data repository and a 3D facies model processor. The facies data repository comprises (i) facies data for a subject reservoir comprising strata defining a sequence stratigraphy comprising one or more sequences of strata, each sequence of the sequence stratigraphy comprising one or more facies, (ii) the sequence stratigraphy for a total strata of the subject reservoir, and (iii) a depositional model for the subject reservoir based on the sequence stratigraphy. The facies data comprises a plurality of depositional inputs for the subject reservoir, and the sequence stratigraphy comprises the one or more sequences of strata for the total strata of the subject reservoir. The 3D facies model processor is communicatively coupled to the 3D facies model memory and operable to execute machine-readable instructions of the model generator component to receive, from the facies data repository, (i) the facies data comprising the plurality of depositional inputs for the subject reservoir and (ii) the sequence stratigraphy comprising the one or more sequences of strata for the subject reservoir, generate a 3D stratigraphic sequence framework comprising a plurality of facies for the subject reservoir based on the facies data and the sequence stratigraphy, and generate a facies volume fraction for each facies of the plurality of facies. The 3D facies model processor is further operable to execute machine-readable instructions of the model generator component to compare each facies volume fraction for each facies of the plurality of facies with the depositional model for the subject reservoir to determine whether a facies of the 3D stratigraphic sequence framework is correctly assigned based on a comparison with the depositional model, and reassign the facies volume fraction for the facies of the plurality of facies to another facies of the plurality of facies when the comparison determines that the facies of the 3D stratigraphic sequence framework is incorrectly assigned. The 3D facies model processor is further operable to execute machine-readable instructions of the model generator component to generate a plurality of 3D probability trends for the plurality of facies, each 3D probability trend associated with respective facies of the plurality of facies based on the facies volume fraction for the respective facies, and generate the 3D facies model based on the plurality of 3D probability trends for the plurality of facies.

In accordance with one embodiment of the present disclosure, a three-dimensional (3D) facies model generator system comprising a 3D facies model memory comprising a model generator component and a facies data repository and a 3D facies model processor communicatively coupled to the 3D facies model memory and operable to execute machine-readable instructions of the model generator component. The facies data repository comprises (i) facies data for a subject reservoir comprising strata defining a sequence stratigraphy comprising one or more sequences of strata, each sequence of the sequence stratigraphy comprising one or more facies, (ii) the sequence stratigraphy for a total strata of the subject reservoir, and (iii) a depositional model for the subject reservoir based on the sequence stratigraphy. The facies data comprises a plurality of depositional inputs for the subject reservoir, and the sequence stratigraphy comprises the one or more sequences of strata for the total strata of the subject reservoir. The 3D facies model processor is operable to execute machine-readable instructions of the model generator component to receive, from the facies data repository, (i) the facies data comprising the plurality of depositional inputs for the subject reservoir and (ii) the sequence stratigraphy comprising the one or more sequences of strata for the subject reservoir, generate a 3D stratigraphic sequence framework comprising a plurality of facies for the subject reservoir based on the facies data and the sequence stratigraphy, and generate a facies volume fraction for each facies of the plurality of facies. The 3D facies model processor is further operable to execute machine-readable instructions of the model generator component to compare each facies volume fraction for each facies of the plurality of facies with the depositional model for the subject reservoir to determine whether a facies of the 3D stratigraphic sequence framework is correctly assigned based on a comparison with the depositional model, and reassign the facies volume fraction for the facies of the plurality of facies to another facies of the plurality of facies when the comparison determines that the facies of the 3D stratigraphic sequence framework is incorrectly assigned. The 3D facies model processor is further operable to execute machine-readable instructions of the model generator component to generate a plurality of 3D probability trends for the plurality of facies based on a plurality of probability logs, each 3D probability trend associated with a respective facies of the plurality of facies based on the facies volume fraction for the respective facies, each facies of the plurality of facies associated with a respective probability log of the plurality of probability logs, and generate the 3D facies model based on the plurality of 3D probability trends for the plurality of facies using a modeling algorithm, wherein the modeling algorithm is one of object based or pixel based.

In accordance with another embodiment of the present disclosure, a method of generating a three-dimensional (3D) facies model comprises receiving, from a facies data repository, (i) facies data comprising a plurality of depositional inputs for a subject reservoir, the facies data for the subject reservoir comprising strata defining a sequence stratigraphy comprising one or more sequences of strata, each sequence of the sequence stratigraphy comprising one or more facies, (ii) the sequence stratigraphy comprising the one or more sequences of strata for the subject reservoir, and (iii) the sequence stratigraphy for a total strata of the subject reservoir. The method further comprises generating a 3D stratigraphic sequence framework comprising a plurality of facies for the subject reservoir based on the facies data and the sequence stratigraphy, generating a facies volume fraction for each facies of the plurality of facies, comparing each facies volume fraction for each facies of the plurality of facies with a depositional model of the facies data repository for the subject reservoir and based on the sequence stratigraphy to determine whether a facies of the 3D stratigraphic sequence framework is correctly assigned based on a comparison with the depositional model, and reassigning the facies volume fraction for the facies of the plurality of facies to another facies of the plurality of facies when the comparison determines that the facies of the 3D stratigraphic sequence framework is incorrectly assigned. The method further comprises generating a plurality of 3D probability trends for the plurality of facies, each 3D probability trend associated with a respective facies of the plurality of facies based on the facies volume fraction for the respective facies, and generating the 3D facies model based on the plurality of 3D probability trends for the plurality of facies.

Although the concepts of the present disclosure are described herein with primary reference to three-dimensional facies model generation, it is contemplated that the concepts will enjoy applicability to any geological model generation. For example, and not by way of limitation, it is contemplated that the concepts of the present disclosure will enjoy applicability to three-dimensional terrain based modeling.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIG. 8 illustrates a minimum thickness, maximum thickness, and volume fractions generated for each facies for the plurality of sequences;

DETAILED DESCRIPTION

Figure 15:
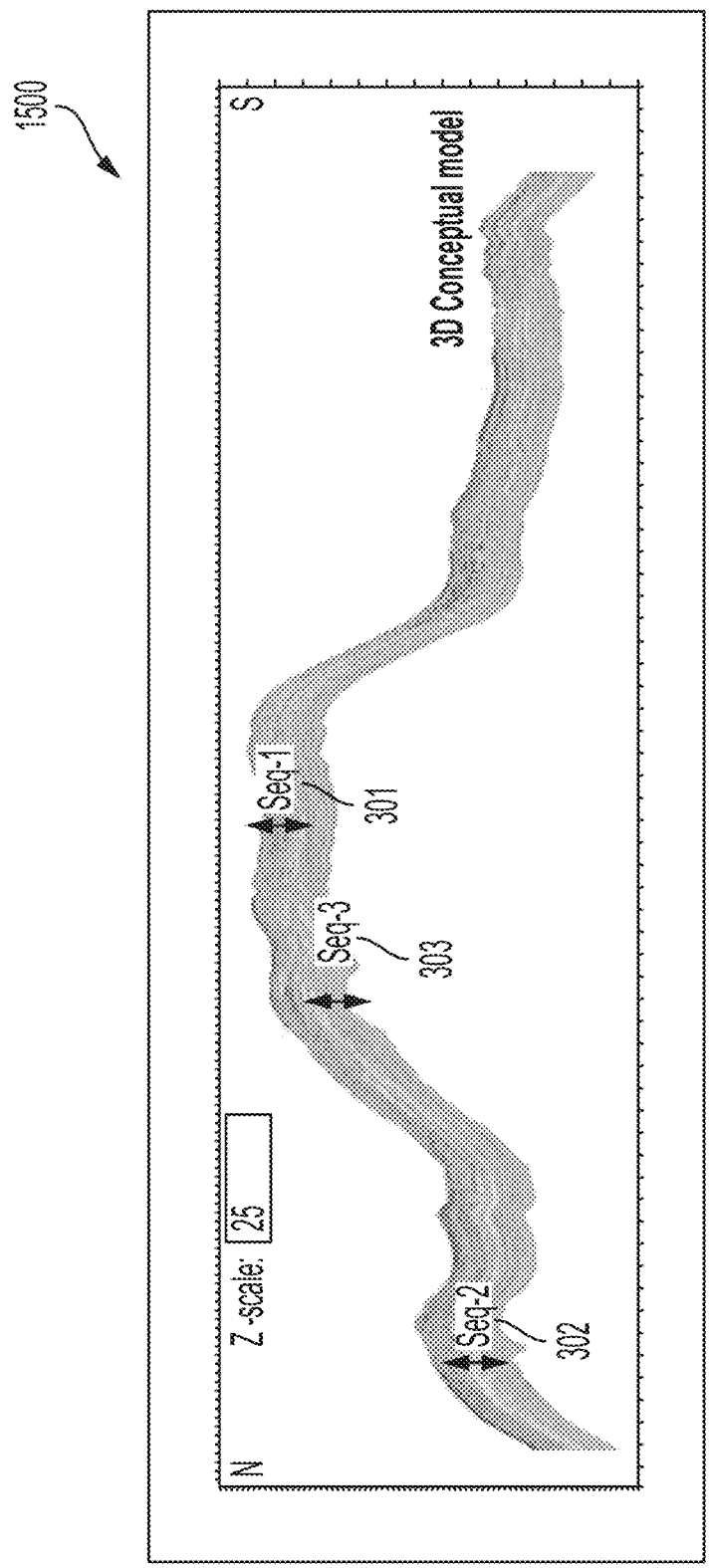
FIG. 15 illustrates a 3D facies model generated via the process of FIG. 2 and the 3D facies model generator system of FIG. 1, according to one or more embodiments shown and described herein.

In embodiments described herein, and as described in greater detail further below, a three-dimensional (3D) facies model generator system 100 includes a 3D facies model memory 106 comprising a model generator component 112 and an facies data repository 116 used to generate a 3D conceptual facies model by connecting geostatistics with a depositional model and accounting for facies related information for hydrocarbon reservoirs (clastic and/or carbonate) such as including one-dimensional (1D) facies description, analogues and depositional systems and depositional environments. The facies data repository 116 includes (i) facies data for a subject reservoir comprising strata defining a sequence stratigraphy comprising one or more sequences of strata, each sequence of strata comprising one or more facies, (ii) the sequence stratigraphy for a total strata of the subject reservoir, and (iii) a depositional model 700 (FIG. 7) for the subject reservoir based on the sequence stratigraphy (such as the plurality of sequences 300 shown in FIG. 3). In embodiments, the strata comprises a plurality of rock layers as part of the sequence stratigraphy, each rock layer of each sequence comprising the one or more facies. Each of the one or more facies may include a specific facies identification representative of a body of rock with specific unique characteristics associated with the specific facies identification representative of the body of rock. The facies data comprises a plurality of depositional inputs for the subject reservoir, and the sequence stratigraphy comprises the one or more sequences of strata for the total strata of the subject reservoir. As will be described in greater detail below, a 3D facies model processor 104 is communicatively coupled to the 3D facies model memory 106 and operable to execute machine-readable instructions of the model generator component 112 to implement one or more processes as described herein to generate a 3D facies model 1500 (FIG. 15).

Figure 1:
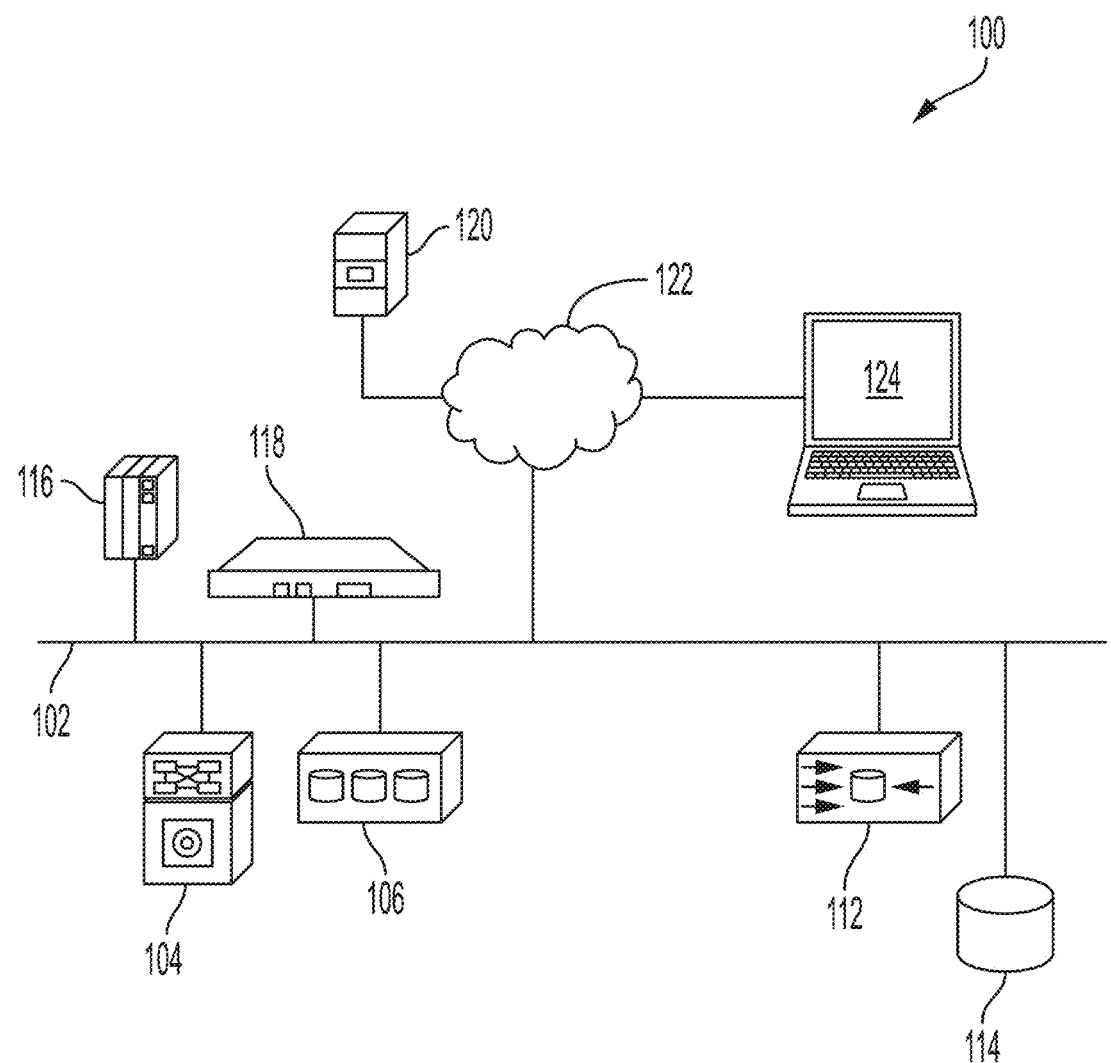
FIG. 1 schematically illustrates a three-dimensional (3D) facies model generator system, according to one or more embodiments shown and described here.
Figure 2:
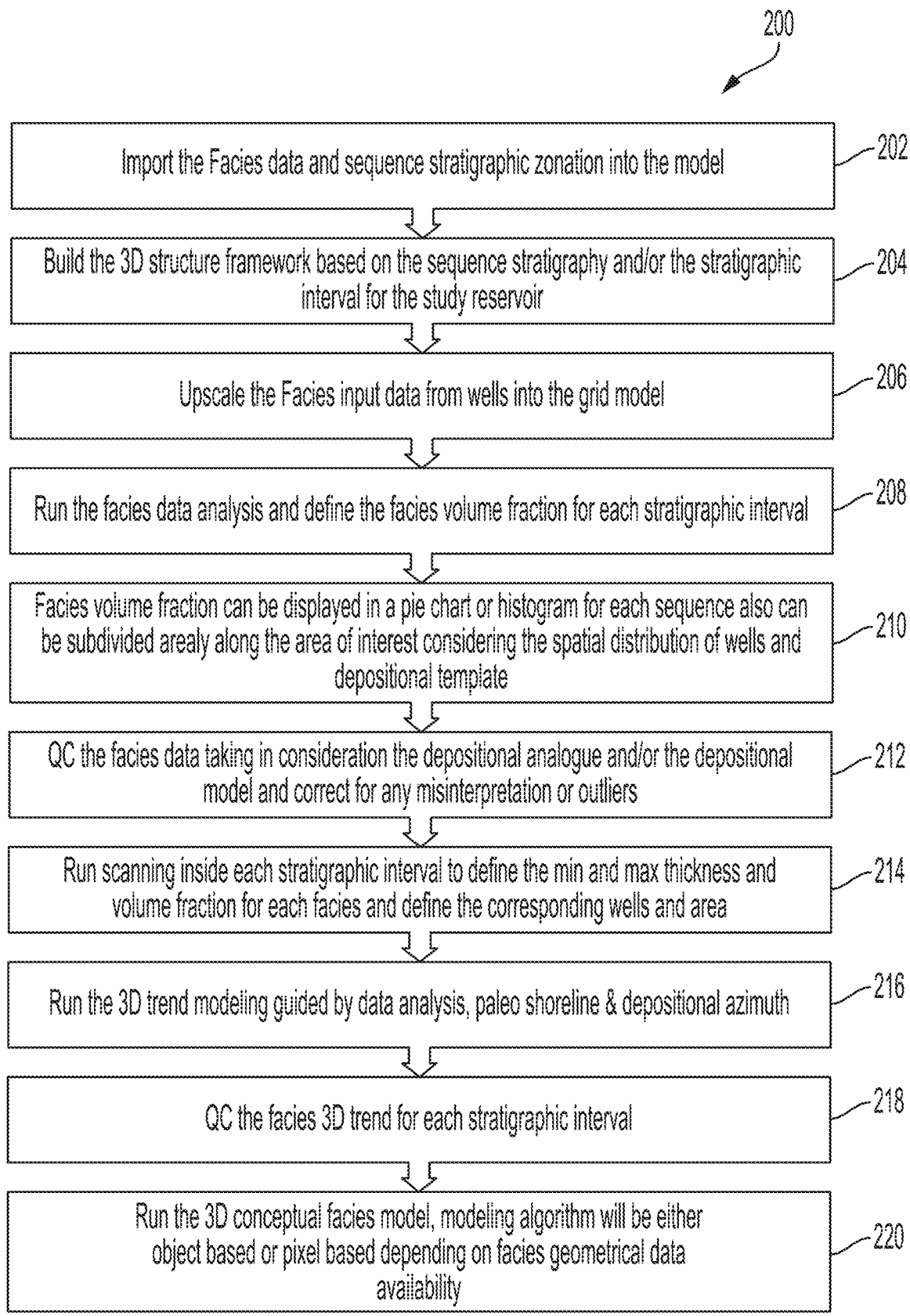
FIG. 2 illustrates a flowchart of a process to use with the 3D facies model generator system of FIG. 1, according to one or more embodiments shown and described herein.

Referring to FIG. 1, a computer implemented embodiment of the 3D facies model generator system 100 is shown for use with and one or more processes described herein, such as with respect to process 200 of FIG. 2 and in greater detail further below. As depicted, the 3D facies model generator system 100 includes a communication path 102, one or more processors 104, the memory 106, the model generator component 112, a storage or database 114, the facies data repository 116, the network interface hardware 118, the server 120, the network 122, and a computing device 124, which are described in greater detail further below. Referring to FIG. 2, a process 200 is shown to use with the 3D facies model generator system 100, which process 200 is described in greater detail further below.

Referring again to FIG. 1, while only one server 120 and one computing device 124 is illustrated, the 3D facies model generator system 100 can comprise multiple servers containing one or more applications and computing devices. In some embodiments, the 3D facies model generator system 100 is implemented using a wide area network (WAN) or network 122, such as an intranet or the internet. The computing device 124 may include digital systems and other devices permitting connection to and navigation of the network 122. It is contemplated and within the scope of this disclosure that the computing device 124 may be a personal computer, a laptop device, a smart mobile device such as a smartphone or smart pad, or the like. Other 3D facies model generator system 100 variations allowing for communication between various geographically diverse components are possible. The lines depicted in FIG. 1 indicate communication rather than physical connections between the various components.

The 3D facies model generator system 100 comprises the communication path 102. The communication path 102 may be formed from any medium that is capable of transmitting a signal such as, for example, conductive wires, conductive traces, optical waveguides, or the like, or from a combination of mediums capable of transmitting signals. The communication path 102 communicatively couples the various components of the 3D facies model generator system 100. As used herein, the term "communicatively coupled" means that coupled components are capable of exchanging data signals with one another such as, for example, electrical signals via conductive medium, electromagnetic signals via air, optical signals via optical waveguides, and the like.

The 3D facies model generator system 100 of FIG. 1 also comprises the processor 104, which may be a 3D facies model processor. The processor 104 can be any device capable of executing machine readable instructions. Accordingly, the processor 104 may be a controller, an integrated circuit, a microchip, a computer, or any other computing device. The processor 104 is communicatively coupled to the other components of the 3D facies model generator system 100 by the communication path 102. Accordingly, the communication path 102 may communicatively couple any number of processors with one another, and allow the modules coupled to the communication path 102 to operate in a distributed computing environment. Specifically, each of the modules can operate as a node that may send and/or receive data.

The illustrated 3D facies model generator system 100 further comprises the memory 106, which may be a 3D facies model memory, and which is coupled to the communication path 102 and communicatively coupled to the processor 104. The memory 106 may be a non-transitory computer readable medium or non-transitory computer readable memory and may be configured as a nonvolatile computer readable medium. The memory 106 may comprise RAM, ROM, flash memories, hard drives, or any device capable of storing machine readable instructions such that the machine readable instructions can be accessed and executed by the processor 104. The machine readable instructions may comprise logic or algorithm(s) written in any programming language such as, for example, machine language that may be directly executed by the processor, or assembly language, object-oriented programming (OOP), scripting languages, microcode, etc., that may be compiled or assembled into machine readable instructions and stored on the memory 106. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Still referring to FIG. 1, as noted above, the 3D facies model generator system 100 comprises the display such as a graphical user interface (GUI) on a screen of the computing device 124 for providing visual output such as, for example, information, graphical reports, messages, or a combination thereof. The display on the screen of the computing device 124 is coupled to the communication path 102 and communicatively coupled to the processor 104. Accordingly, the communication path 102 communicatively couples the display to other modules of the 3D facies model generator system 100. The display can comprise any medium capable of transmitting an optical output such as, for example, a cathode ray tube, light emitting diodes, a liquid crystal display, a plasma display, or the like. Additionally, it is noted that the display or the computing device 124 can comprise at least one of the processor 104 and the memory 106. While the 3D facies model generator system 100 is illustrated as a single, integrated system in FIG. 1, in other embodiments, the systems can be independent systems.

The 3D facies model generator system 100 comprises the model generator component 112 as described above, and the facies data repository 116. The model generator component 112 may include an artificial intelligence component to train and provide machine learning capabilities to a depositional templates and training images as described herein. By way of example, and not as a limitation, multi-points statistics and training images may be utilized. The model generator component 112 and the facies data repository 116 are coupled to the communication path 102 and communicatively coupled to the processor 104. As will be described in further detail below, the processor 104 may process the input signals received from the system modules and/or extract information from such signals.

The 3D facies model generator system 100 comprises the network interface hardware 118 for communicatively coupling the 3D facies model generator system 100 with a computer network such as network 122. The network interface hardware 118 is coupled to the communication path 102 such that the communication path 102 communicatively couples the network interface hardware 118 to other modules of the 3D facies model generator system 100. The network interface hardware 118 can be any device capable of transmitting and/or receiving data via a wireless network. Accordingly, the network interface hardware 118 can comprise a communication transceiver for sending and/or receiving data according to any wireless communication standard. For example, the network interface hardware 118 can comprise a chipset (e.g., antenna, processors, machine readable instructions, etc.) to communicate over wired and/or wireless computer networks such as, for example, wireless fidelity (Wi-Fi), WiMax, Bluetooth, IrDA, Wireless USB, Z-Wave, ZigBee, or the like.

Still referring to FIG. 1, data from various applications running on computing device 124 can be provided from the computing device 124 to the 3D facies model generator system 100 via the network interface hardware 118. The computing device 124 can be any device having hardware (e.g., chipsets, processors, memory, etc.) for communicatively coupling with the network interface hardware 118 and a network 122. Specifically, the computing device 124 can comprise an input device having an antenna for communicating over one or more of the wireless computer networks described above.

The network 122 can comprise any wired and/or wireless network such as, for example, wide area networks, metropolitan area networks, the internet, an intranet, satellite networks, or the like. Accordingly, the network 122 can be utilized as a wireless access point by the computing device 124 to access one or more servers (e.g., a server 120). The server 120 and any additional servers generally comprise processors, memory, and chipset for delivering resources via the network 122. Resources can include providing, for example, processing, storage, software, and information from the server 120 to the 3D facies model generator system 100 via the network 122. Additionally, it is noted that the server 120 and any additional servers can share resources with one another over the network 122 such as, for example, via the wired portion of the network, the wireless portion of the network, or combinations thereof.

In an embodiment, the 3D facies model generator system 100 may include machine readable instructions stored in the memory 106 communicatively coupled to the processor 104 to implement a control scheme such as the process 200 of FIG. 2 as described herein. The process 200 is an embodiment of a workflow to build a 3D facies model for a subject reservoir based on depositional inputs, such as a library of 2D depositional templates, a defined paleo shoreline direction, a defined depositional azimuth, and input geo-bodies dimensions. In block 202, facies data and sequence stratigraphic zonation may be imported into a grid model. The 3D facies model processor 104 communicatively coupled to the 3D facies model memory 106 may be operable to execute machine-readable instructions of the model generator component 112 to receive, from the facies data repository 116, (i) the facies data comprising the plurality of depositional inputs for the subject reservoir and (ii) the sequence stratigraphy comprising the one or more sequences 301, 302, and 303 of strata (FIG. 3) for the subject reservoir.

Figure 3:
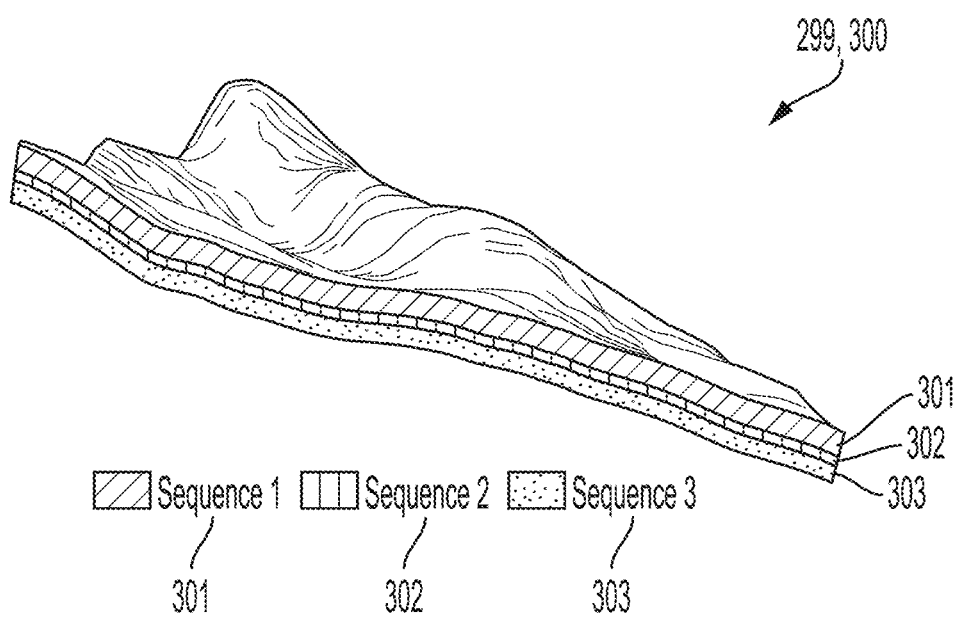
FIG. 3 illustrates a 3D stratigraphic sequence framework generated via the process of FIG. 2 and the 3D facies model generator system of FIG. 1, according to one or more embodiments shown and described herein.

In block 204, the imported data and zonation may be used to build a 3D stratigraphic sequence framework based on the sequence stratigraphy and/or the stratigraphic interval for the study reservoir. FIG. 3 illustrates a 3D stratigraphic sequence framework 299 generated via the process 200 of FIG. 2 and the 3D facies model generator system 100 of FIG. 1. The 3D facies model processor 104 may be operable to execute machine-readable instructions of the model generator component 112 to generate the 3D stratigraphic sequence framework 299 comprising a plurality of facies 404 (FIG. 4A) for the subject reservoir based on the facies data and the sequence stratigraphy. The 3D facies model processor 104 may be further operable to execute machine-readable instructions of the model generator component 112 to (i) generate the 3D stratigraphic sequence framework 299 comprising a plurality of sequences 300 based on the one or more sequences of strata of the sequence stratigraphy, wherein each sequence of the plurality of sequences 300 comprises at least one facies 404 from the plurality of facies 404 for the subject reservoir, and (ii) generate the facies volume fraction for each facies 404 of each sequence of the plurality of sequences 300.

Figure 4A:
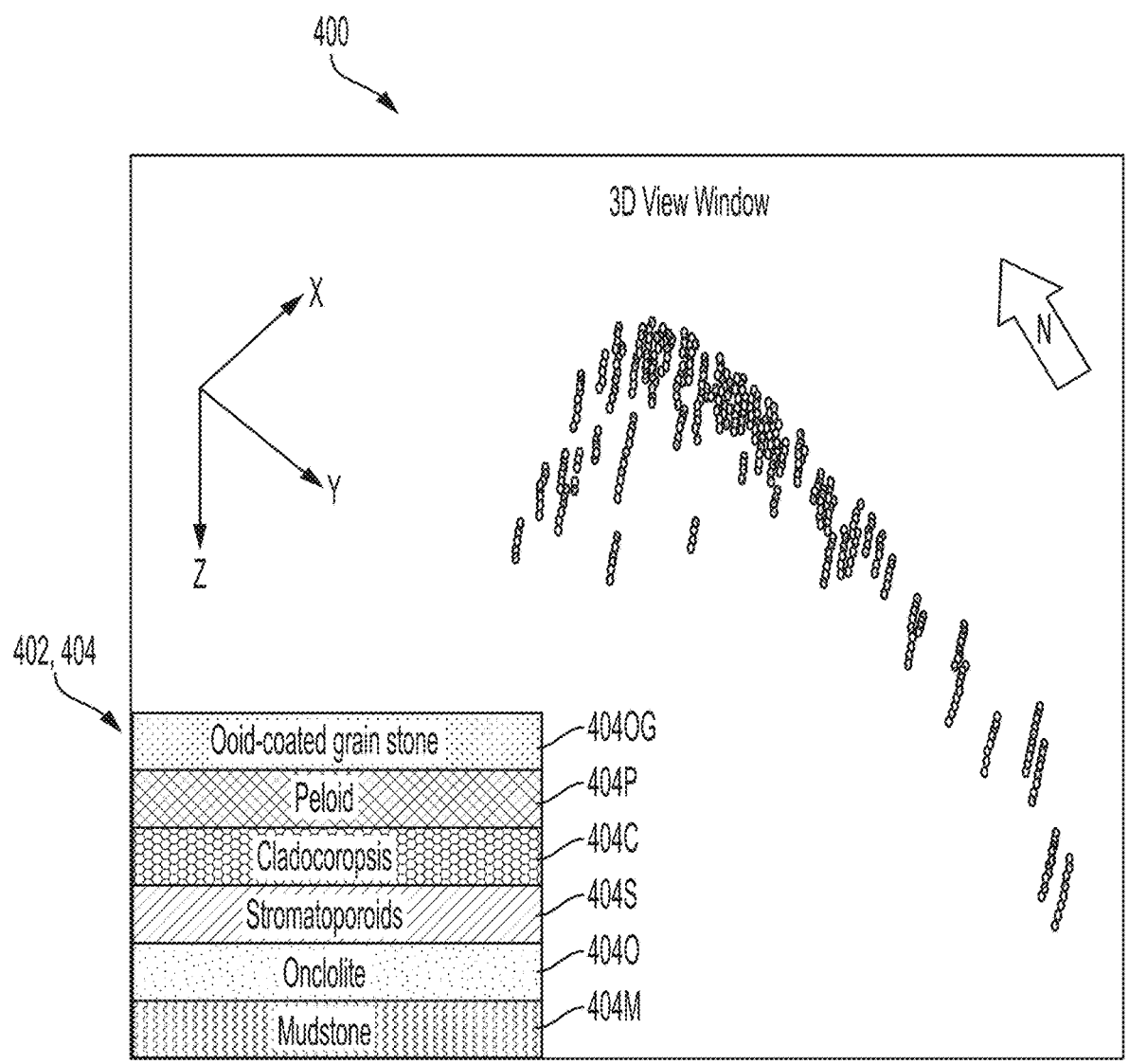
FIG. 4A illustrates 3D View Window Display used for upscaling of facies input data from wells into a grid model, according to one or more embodiments shown and described herein.
Figure 4B:
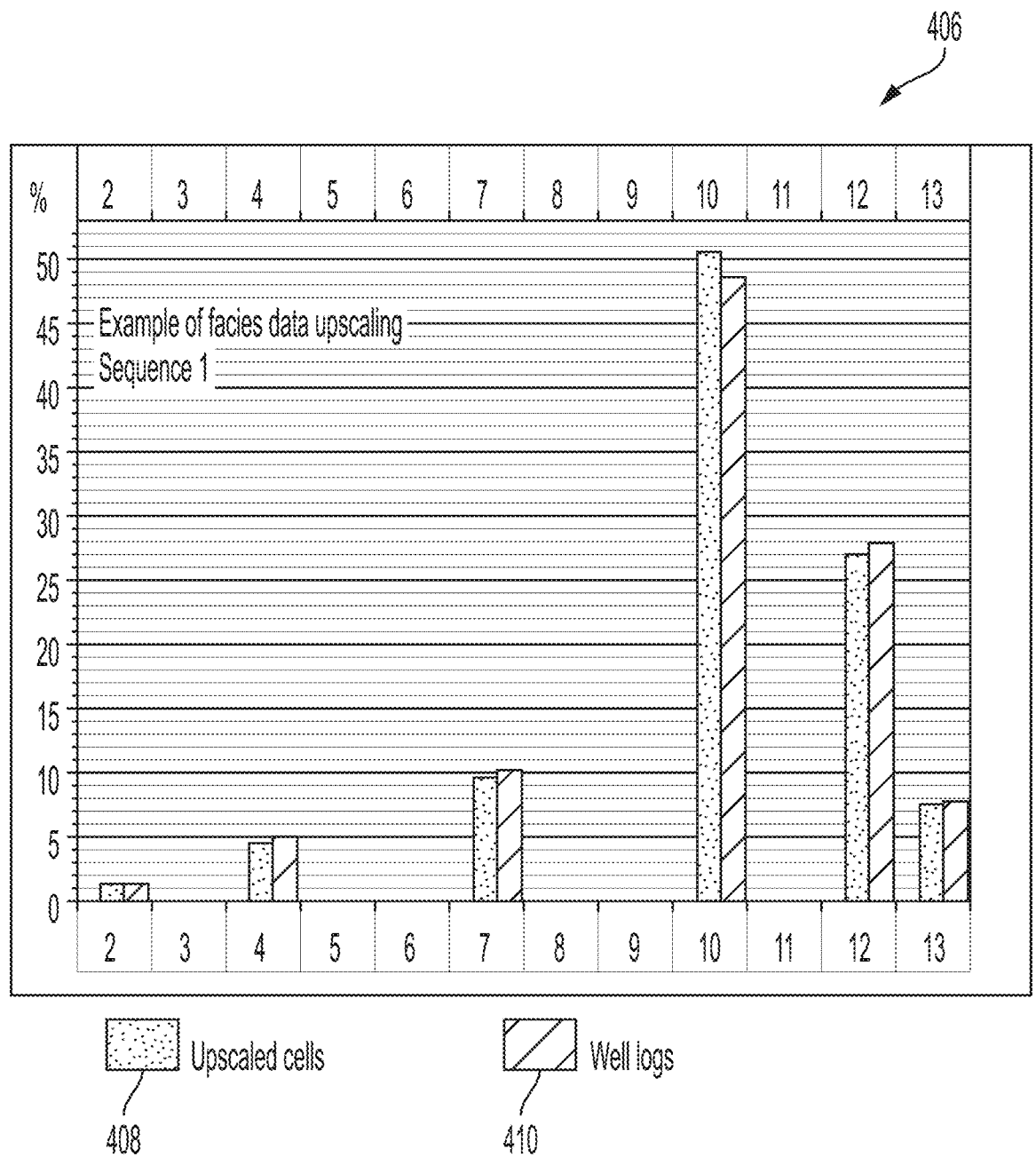
FIG. 4B illustrates a facies data upscaling to a grid model for a sequence of strata, according to one or more embodiments shown and described herein.

In block 206 of FIG. 2, facies input data from wells may be upscaled into the grid model. FIG. 4A illustrates 3D View Window Display 400 used for upscaling of facies input data from wells into the grid model for all sequences where well trajectories and associates facies data are converted into grid cells at the grid model resolution, the Display 400 including 3D x, y, and z axes and a North (N) facing indicator. A legend 402 shows the plurality of facies 404, respectively set forth as facies 4040G for Ooid-coated grain stone, facies 404P for Peloid, facies 404C for Cladocoropsis, facies 404S for Stromatoporoids, facies 4040 for Onclolite, and facies 404M for Mudstone. FIG. 4B illustrates a facies data upscaling 406 to the grid model for a sequence of strata. The 3D facies model processor 104 may be further operable to execute machine-readable instructions of the model generator component 112 to upscale the facies data from well log data of one or more wells of the subject reservoir to assign to upscaled cells 408 to display in a grid model, and display the upscaled cells 408 in the grid model such as shown in FIG. 4B against the well log data 410 for the one or more wells. In embodiments, the upscaled cells in the grid model may be displayed against the well log data for the one or more wells for each sequence of the one or more sequences of strata for the subject reservoir.

Figure 5:
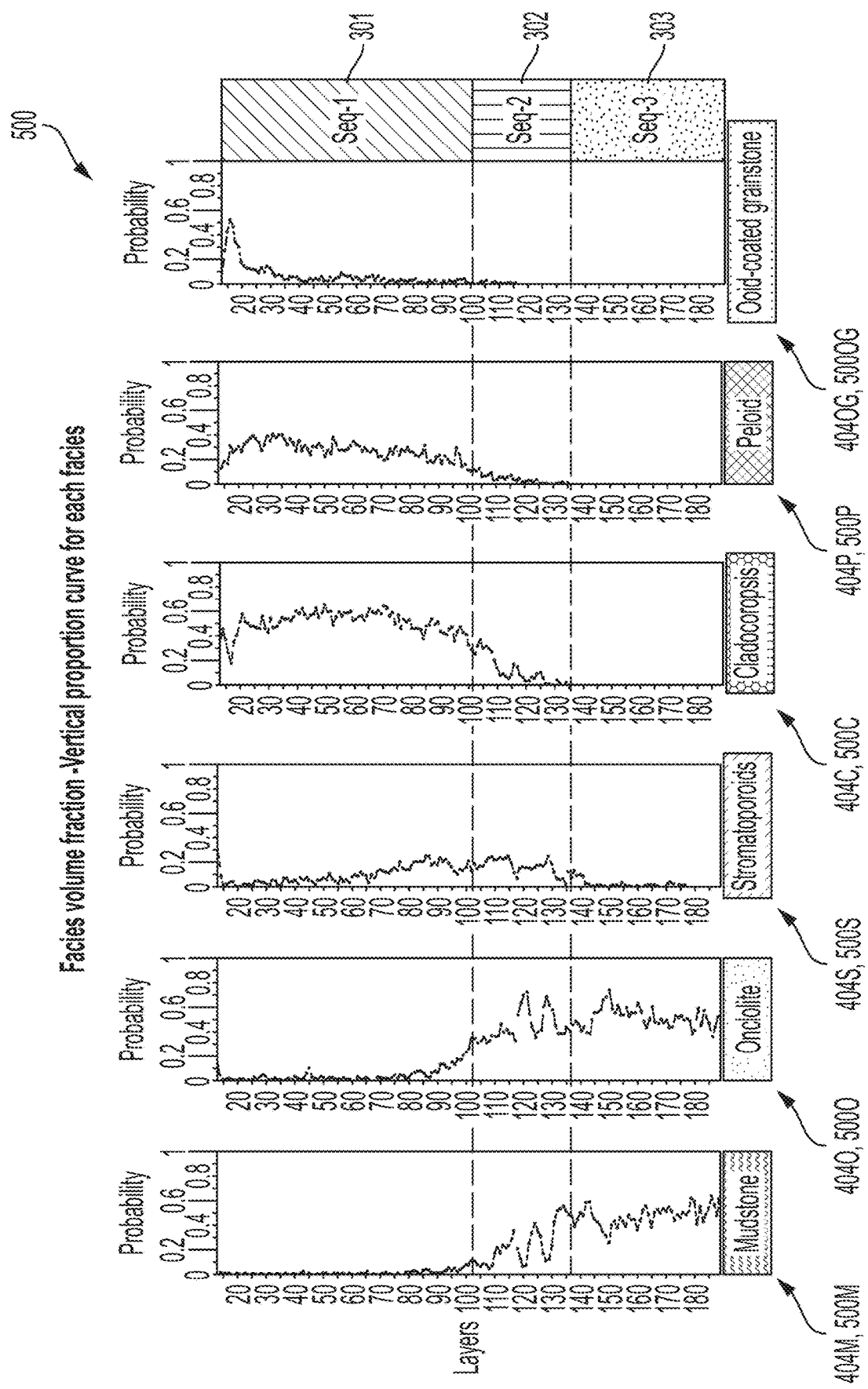
FIG. 5 illustrates a facies volume fraction generated for each facies for a plurality of sequences of the 3D stratigraphic sequence framework of FIG. 3 via the process of FIG. 2 and the 3D facies model generator system of FIG. 1, according to one or more embodiments shown and described herein.

In block 208 of FIG. 2, the facies data is analyzed to define a facies volume fraction for each stratigraphic level (i.e., a first sequence 301, a second sequence 302, and a third sequence 303). FIG. 5 illustrates a facies volume fraction chart 500 generated for each facies 404M, 4040, 404S, 404C, 404P, and 4040G of the plurality of facies 404 for a plurality of sequences 301, 302, 303 of the 3D stratigraphic sequence framework 299 of FIG. 3 via the process 200 of FIG. 2 and the 3D facies model generator system 100 of FIG. 1. As a non-limiting example, a facies volume chart 500M for facies 404M associated with Mudstone is shown that indicates a higher volume fraction of facies 404M in the third sequence 303 than in the first sequence 301, and a facies volume chart 500C for facies 404C associated with Cladocoropsis is shown that indicates a higher volume fraction of facies 404C in the first sequence 301 than in the third sequence 303. The 3D facies model processor 104 may be operable to execute machine-readable instructions of the model generator component 112 to generate a facies volume fraction for each facies of the plurality of facies 404.

Figure 6:
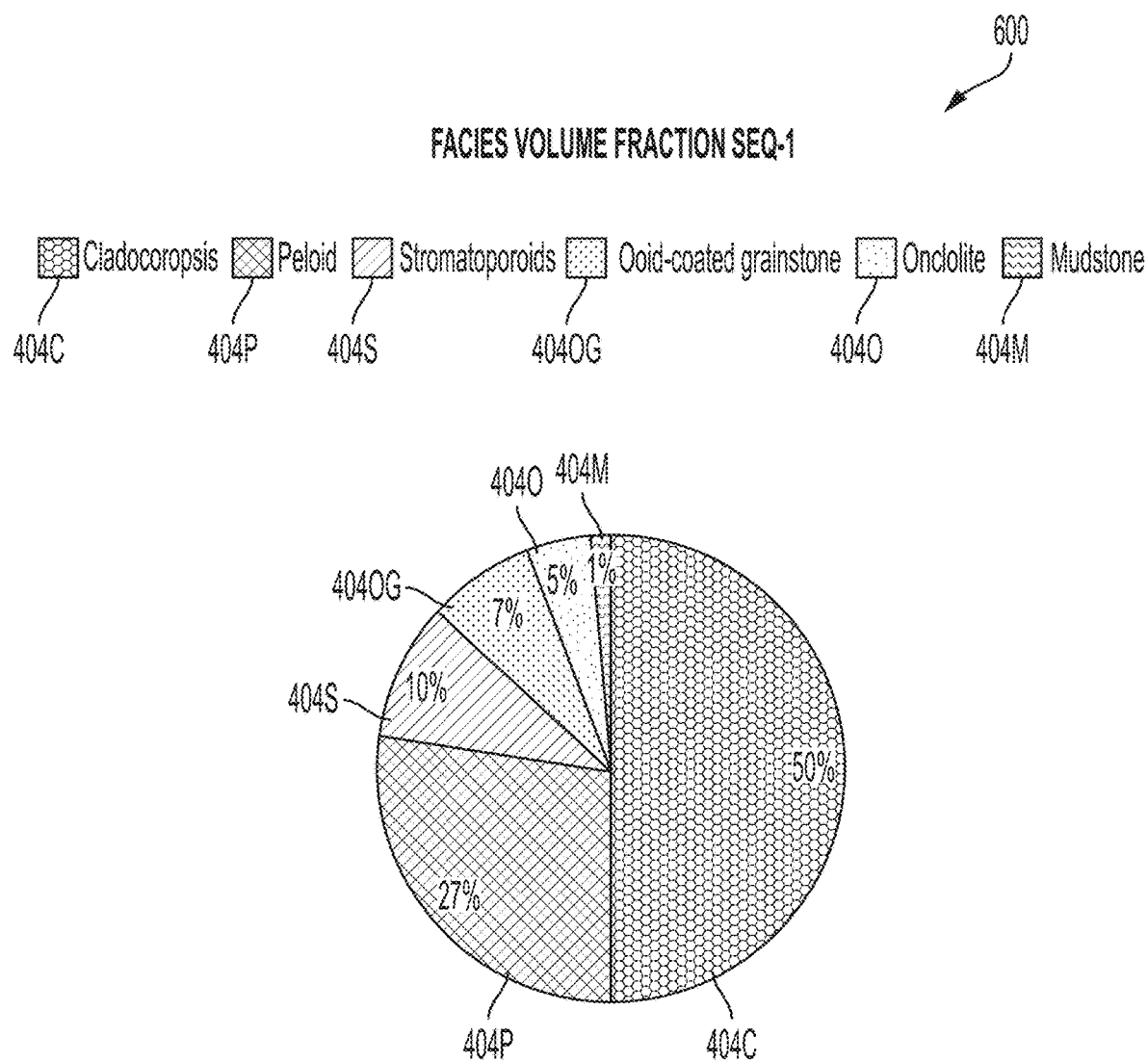
FIG. 6 illustrates a pie chart showing the facies volume fraction for each facies for a first sequence of FIG. 5.

In block 210 of FIG. 2, the defined facies volume fractions for a total strata or for a sequence of the total strata may be displayed in a pie chart. FIG. 6 illustrates a pie chart 600 showing the facies volume fraction for each facies 404 for the first sequence 301 of FIG. 5. As a non-limiting example, the pie chart 600 of FIG. 6 shows facies 404C associated with Cladocorpsis as having a volume fraction of 50% in the first sequence 301, and the facies 404M associated with Mudstone having a volume fraction of 1% in the first sequence 301. The 3D facies model processor 104 may be operable to execute machine-readable instructions of the model generator component 112 to display the facies volume fraction for each facies 404 in a pie chart 600. In embodiments, the facies volume fraction for each facies 404 of a sequence of the plurality of sequences 300 may be displayed in a sequence pie chart 600, such as shown in FIG. 6.

Figure 7:
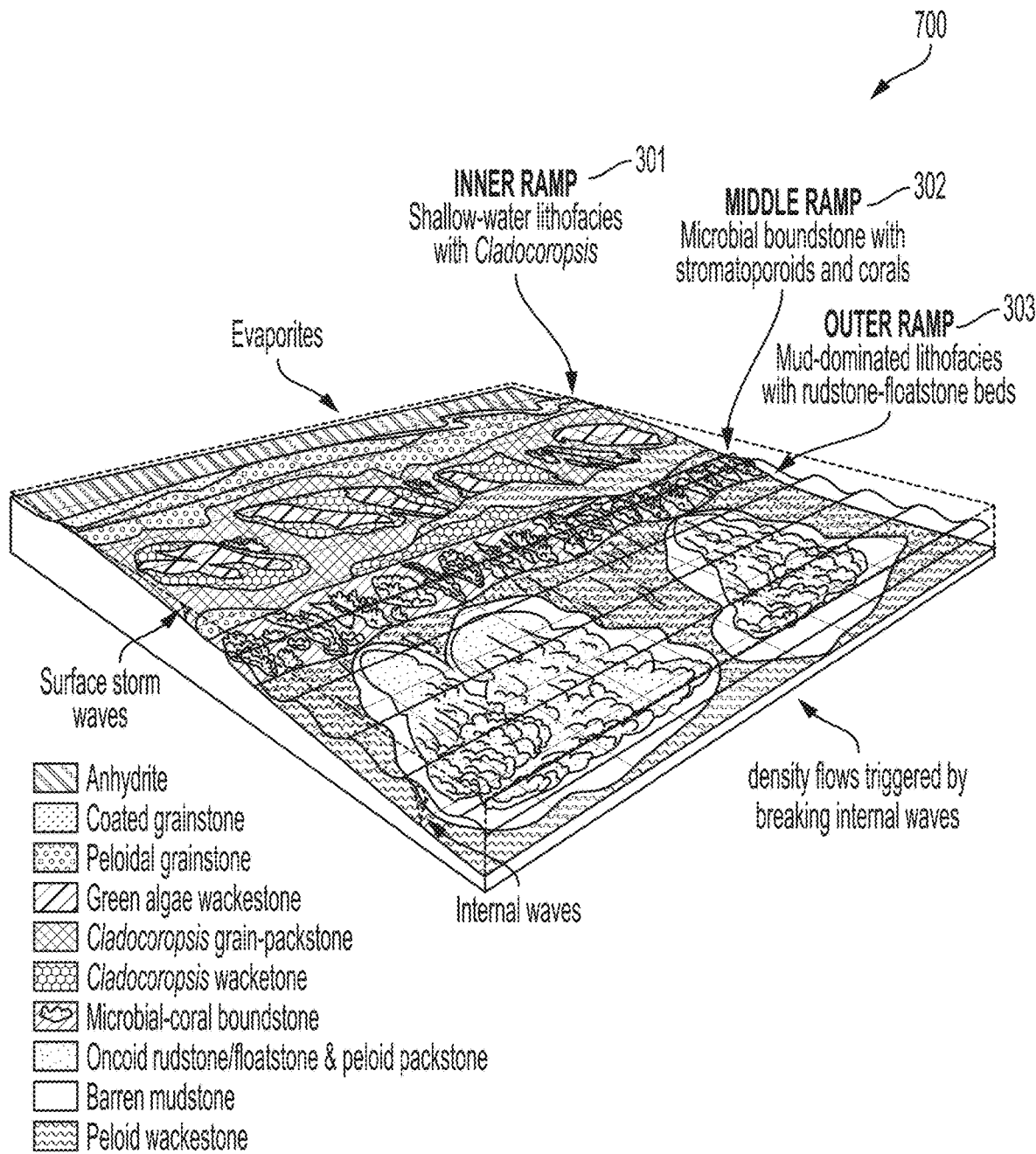
FIG. 7 illustrates a depositional model for a study reservoir for which the 3D stratigraphic sequence framework of FIG. 3 is generated.

In block 212 of the process 200 of FIG. 2, the resulting facies data may be checked for accuracy against a depositional model. The facies data may be quality checked (undergo a "QC" process) taking into consideration the depositional analogue and/or the depositional model to correct the data for any misinterpreted data or outliers determined from the QC process. For example, outliers or incorrect facies may be assigned to a correct facies and the facies volume fractions adjusted. FIG. 7 illustrates a depositional model 700 for a study reservoir for which the 3D stratigraphic sequence framework 299 of FIG. 3 is generated. In the depositional model 700 embodiment of FIG. 7, the first sequence 301 is associated with an inner ramp including shallow-water lithofacies with Cladocoropsis, the second sequence 302 is associated with a middle ramp including microbial boundstone with stromaoporoids and corals, and the third sequence 303 is associated with an outer ramp including mud-dominated lithofacies with rudstone-floatstone beds.

The 3D facies model processor 104 may be operable to execute machine-readable instructions of the model generator component 112 to compare each facies volume fraction for each facies of the plurality of facies 404 with the depositional model 700 for the subject reservoir to determine whether a facies of the 3D stratigraphic sequence framework 299 is correctly assigned based on a comparison with the depositional model 700, and reassign the facies volume fraction for the facies of the plurality of facies 404 to another facies of the plurality of facies 404 when the comparison determines that the facies of the 3D stratigraphic sequence framework 299 is incorrectly assigned. A QC process may be applied to check a consistency between facies description from well data and the depositional model 700 for the study reservoir and/or analogue, such as through comparison of the pie chart 600 of FIG. 6 for the first sequence 301 with the first sequence 301 associated with the inner ramp of the depositional model 700 of FIG. 7. The depositional model 700 indicates that the study reservoir is representative of a shallowing upward or coursing upward cycle. An interpreted oncolite rudstone associated with facies 404O showing a volume fraction of 5% in FIG. 6 and an interpreted mudstone associated with facies 404M and showing a volume fraction of 1% in FIG. 6 may be potential misinterpreted facies or outliers as these facies 404O, 404M relate to the third sequence 303 per the depositional model 700. Thus, these facies 404O, 404M may be assigned to another facies 404 in the first sequence 301 by inspecting physical properties such as porosity and permeability and assigning the facies 404O and/or 404M to a facies 404 in the first sequence 301 with similar properties.

The 3D facies model processor 104 may be further operable to execute machine-readable instructions of the model generator component 112 to compare each facies volume fraction for each facies 404 of the at least one facies for each sequence of the plurality of sequences 300 of the 3D stratigraphic sequence framework 299 with the depositional model 700 for the subject reservoir to determine whether a sequence facies for a sequence of the 3D stratigraphic sequence framework 299 is correctly assigned based on the comparison with the depositional model 700. The facies volume fraction for the sequence facies of the sequence of the plurality of sequences 300 may be reassigned to another sequence facies of the at least one facies of the sequence when the comparison determines that the sequence facies of the 3D stratigraphic sequence framework 299 is incorrectly assigned.

In block 214 of the process 200 of FIG. 2, each stratigraphic layer/interval may be scanned to define a maximum thickness, a minimum thickness, and volume fraction for each facies and to define corresponding wells and area. FIG. 8 illustrates chart 800 showing volume fractions generated for each facies 404 (i.e., 404M, 404O, 404S, 404C, 404P, and 404OG as shown) for the plurality of sequences 300. The chart 800 includes columns including code 802 to set forth the codes for the plurality of facies 404, name 804 to set forth the respective names for each of the plurality of facies 404, a percentage volume fraction 806, an additional metric value N (number of samples) 808 for each facies 404, an Intervals value 810 for each facies 404, a minimum thickness 812 as shown in feet for each facies 404, a maximum thickness 814 as shown in feet for each facies 404, and a standard deviation 816 for each facies 404. In embodiments, a mean thickness may be shown as well. The 3D facies model processor 104 may be further operable to execute machine-readable instructions of the model generator component 112 to generate a minimum thickness, a maximum thickness, and volume fraction for each facies of the plurality of facies based on the sequence stratigraphy. The minimum thickness, the maximum thickness, and the volume fraction for each facies of the plurality of facies 404 may further be displayed such as shown in in chart 800 of FIG. 8. The 3D facies model processor 104 may be further operable to execute machine-readable instructions of the model generator component 112 to (i) generate the 3D stratigraphic sequence framework 299 comprising a plurality of sequences 300 based on the one or more sequences of strata of the sequence stratigraphy, wherein each sequence of the plurality of sequences comprises at least one facies from the plurality of facies 404 for the subject reservoir, and (ii) generate a minimum and a maximum thickness and volume fraction for each facies of the plurality of facies 404 for each of the plurality of sequences 300.

Figure 9:
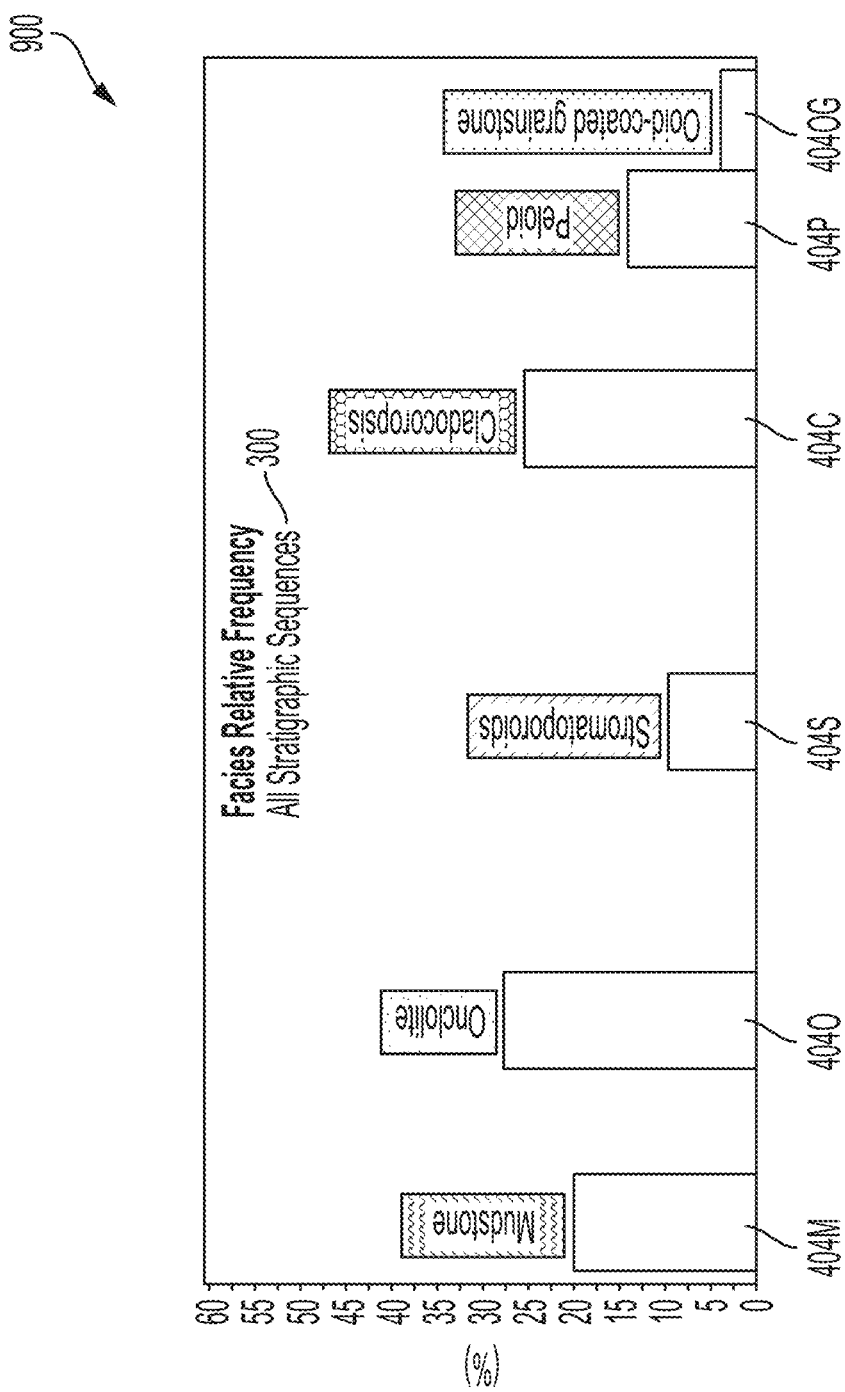
FIG. 9 illustrates a facies relative frequency chart for each facies for the plurality of sequences.
Figure 10:
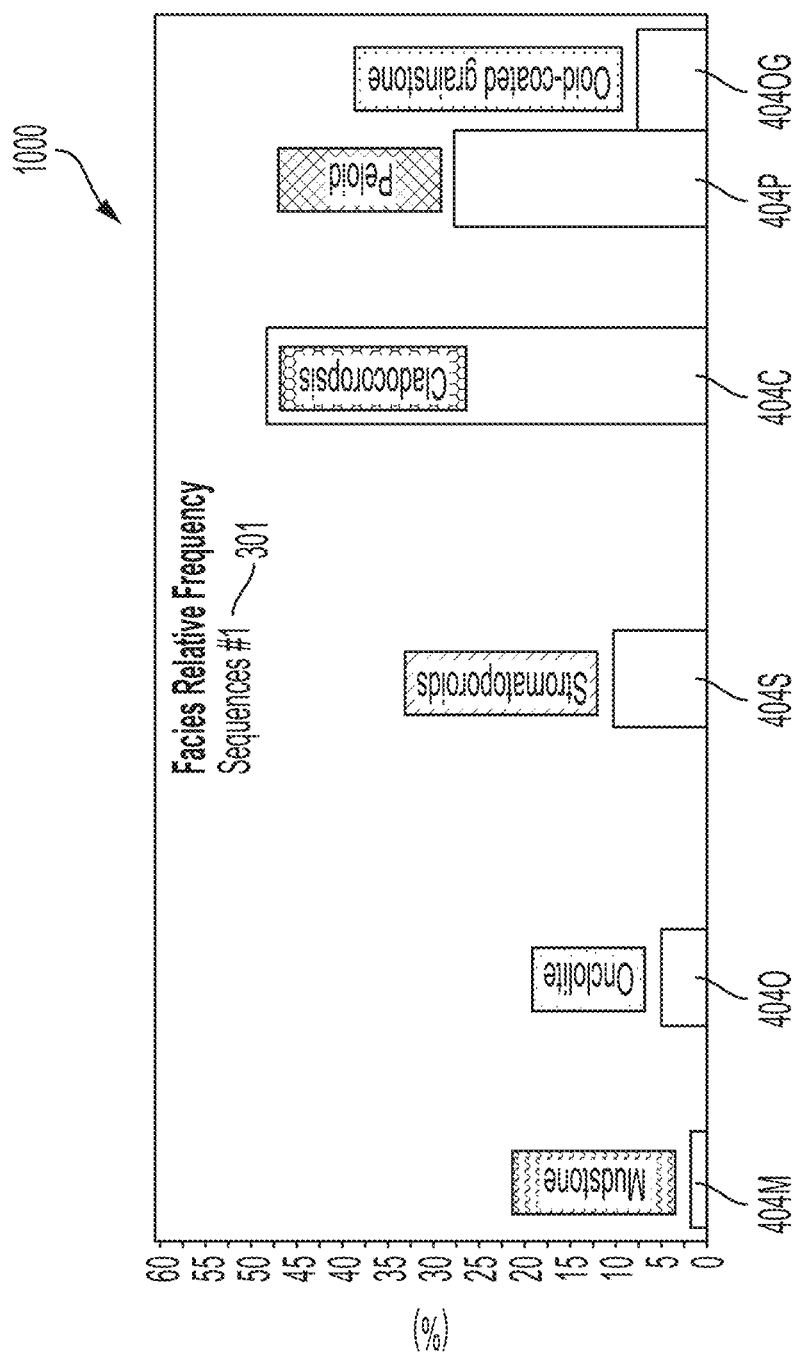
FIG. 10 illustrates a facies relative frequency chart for each facies for a first sequence of the plurality of sequences.
Figure 11:
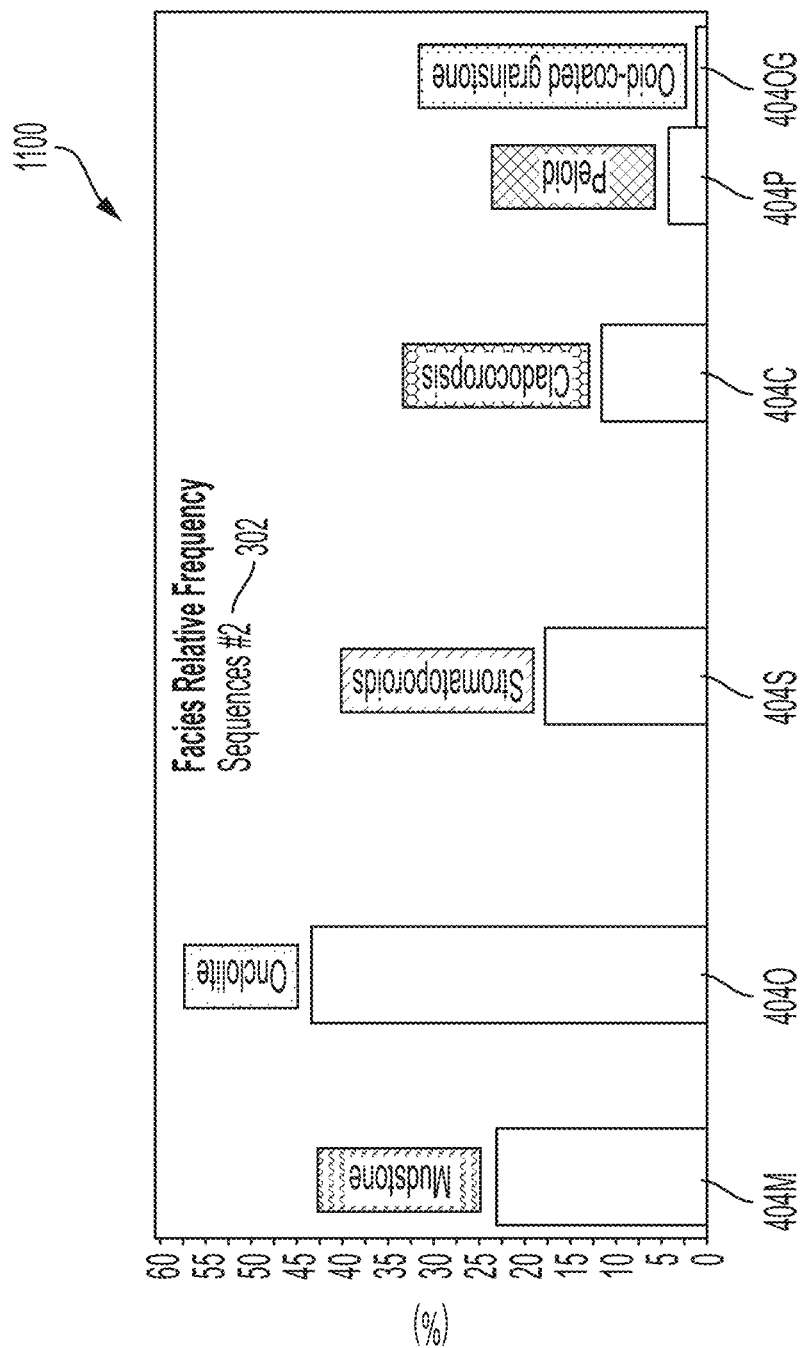
FIG. 11 illustrates a facies relative frequency chart for each facies for a second sequence of the plurality of sequences.
Figure 12:
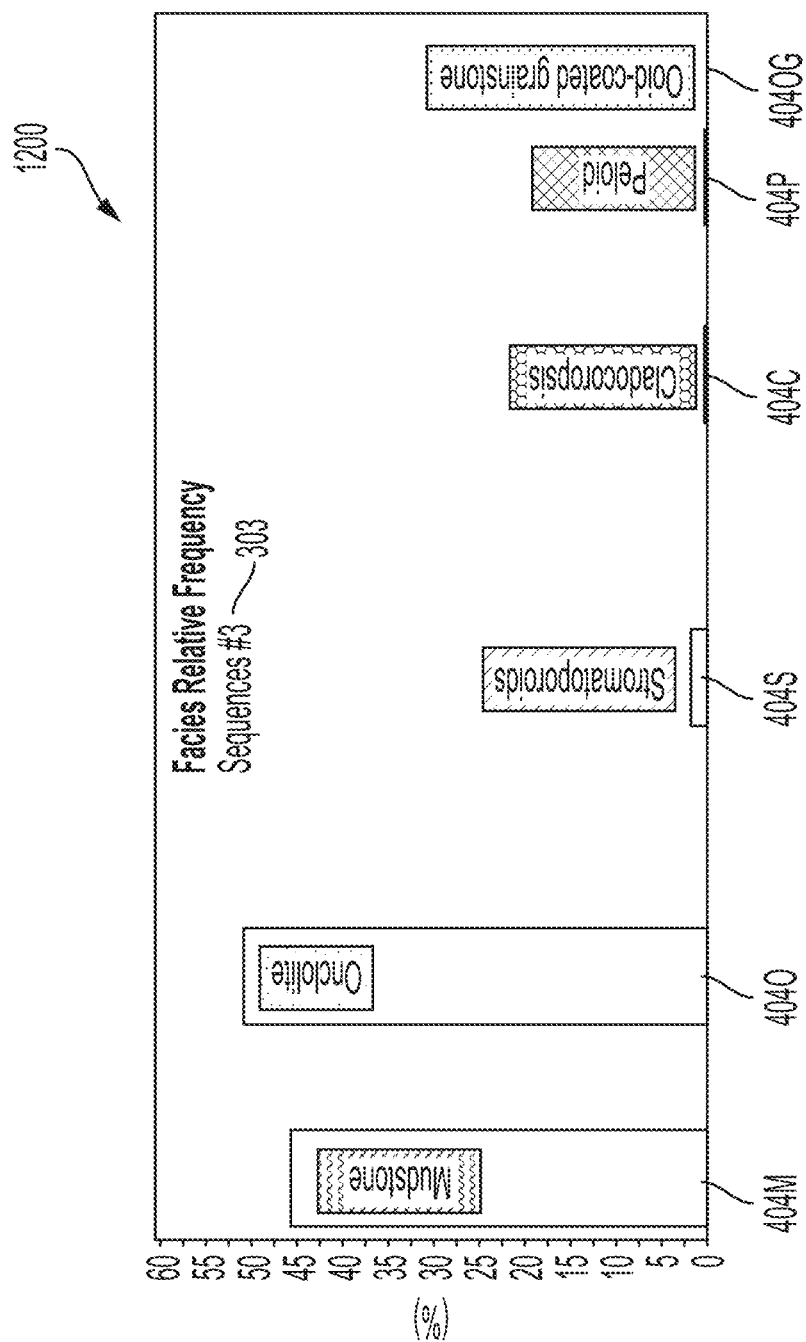
FIG. 12 illustrates a facies relative frequency chart for each facies for a third sequence of the plurality of sequences.

The minimum and the maximum thickness and volume fraction for each facies of the plurality of facies 404 may be displayed for at least one of the plurality of sequences 300. FIGS. 9-10 display the relative frequency of input facies 404 on histogram charts respectively for all sequences and then for each sequence of the plurality of sequences 300. FIG. 9 illustrates a facies relative frequency chart 900 for each facies 404 for the plurality of sequences 300. FIG. 10 illustrates a facies relative frequency chart 1000 for each facies 404 for a first sequence 301 of the plurality of sequences 300. FIG. 11 illustrates a facies relative frequency chart 1100 for each facies 404 for a second sequence 302 of the plurality of sequences 300. FIG. 12 illustrates a facies relative frequency chart 1200 for each facies 404 for a third sequence 303 of the plurality of sequences 300.

Figure 13:
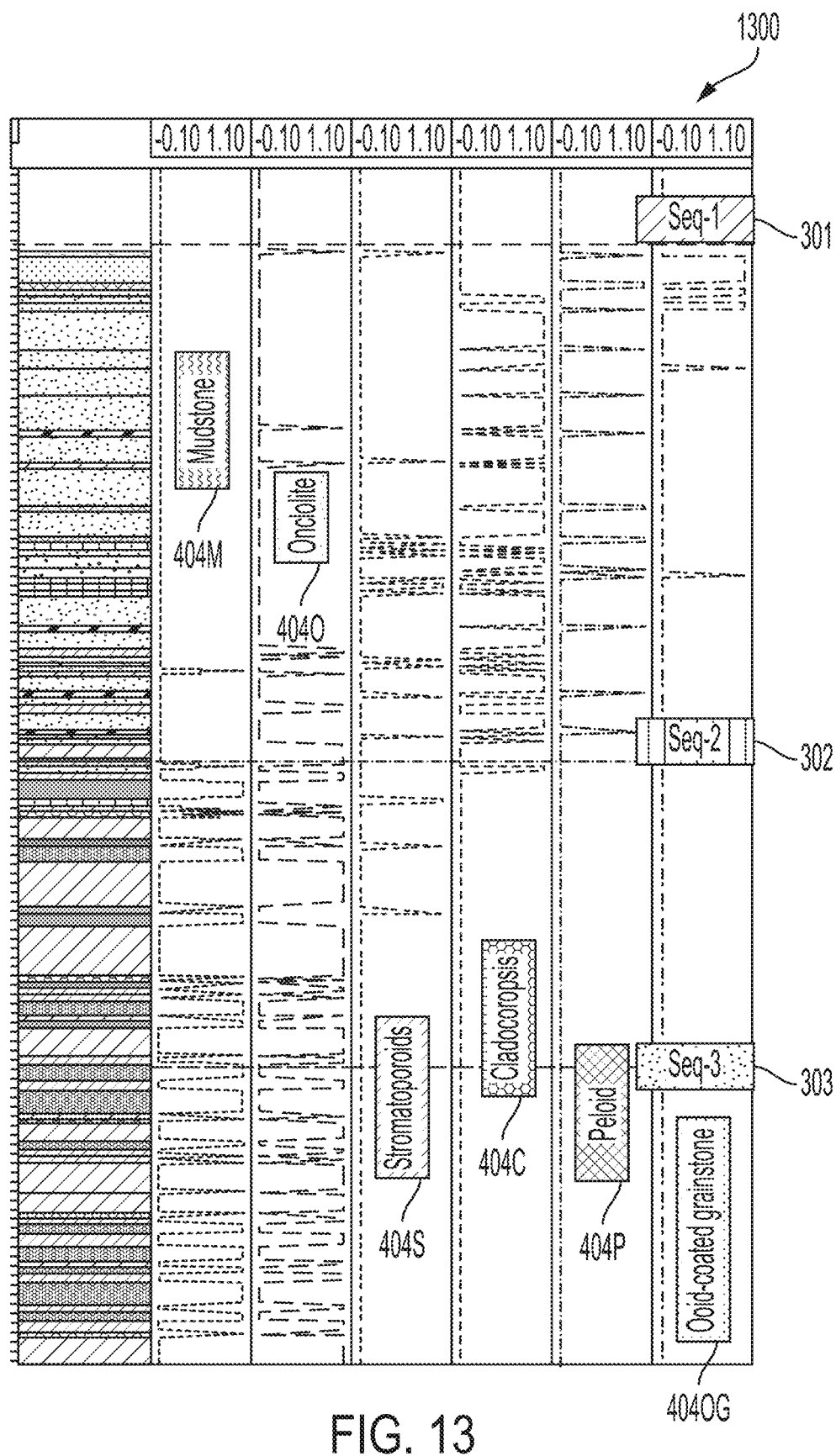
FIG. 13 illustrates a probability log for each facies for the plurality of sequences for the 3D stratigraphic sequence framework of FIG. 3.
Figure 14:
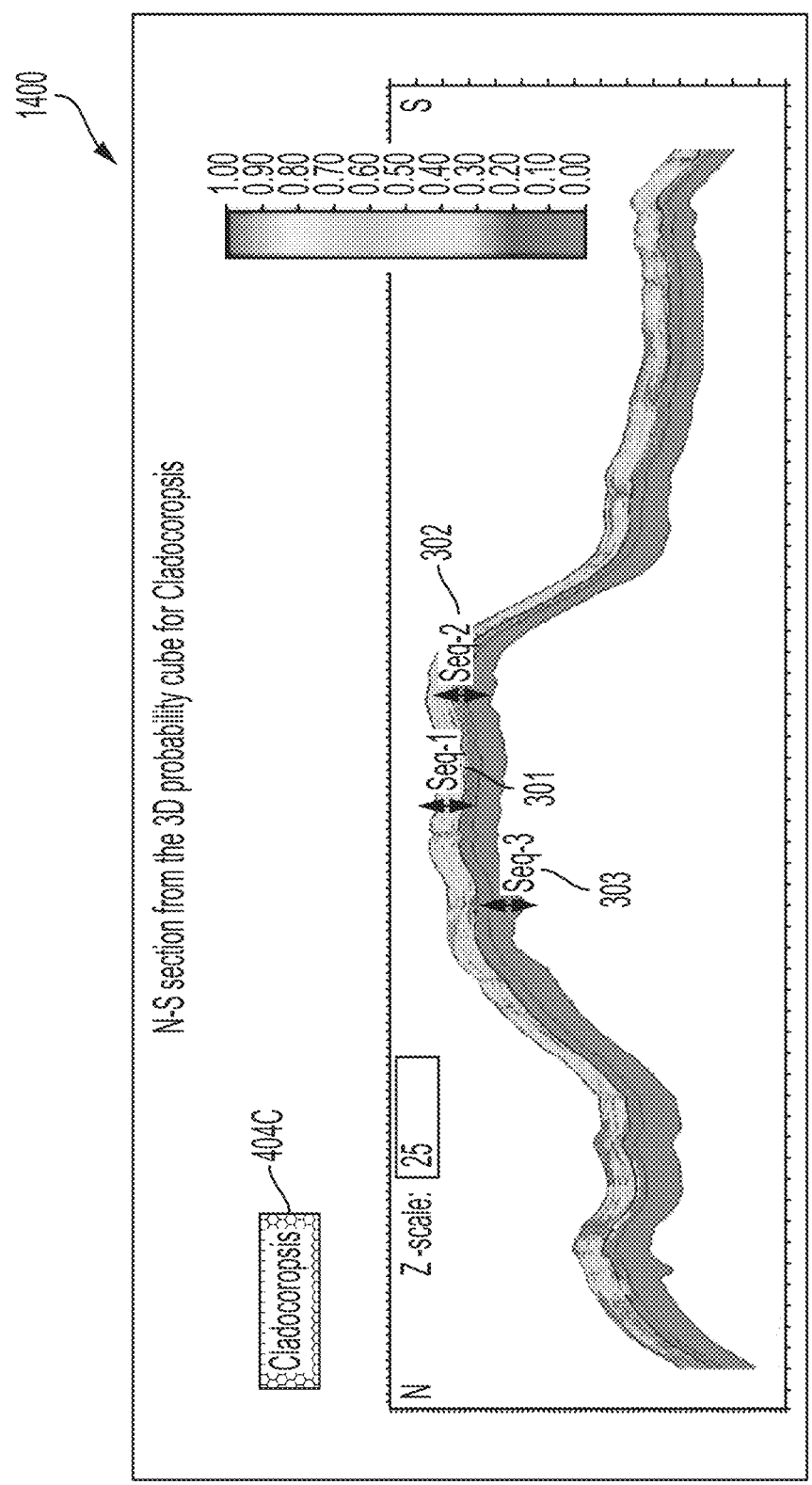
FIG. 14 illustrates a 3D probability trend based on the probability log of FIG. 13 for a specific facies with respect to the plurality of sequences.

In block 216 of the process 200 of FIG. 2, a 3D trend model may be generated based on data analysis, paleo shoreline, and depositional azimuth. Probabilities as a log curve may be generated for each facies based on the facies input data at wells (e.g., based on the defined facies volume fractions for each stratigraphic interval). If the facies exist, then the probability would equal one, otherwise the probability will be zero if the facies does not exist. FIG. 13 illustrates a probability log 1300 for each facies 404M, 404O, 404S, 404C, 404P, and 404OG for the plurality of sequences 300 including the first sequence 301, the second sequence 302, and the third sequence 303 for the 3D stratigraphic sequence framework 299 of FIG. 3. The first overall log track is representative of the described facies 404 along a well trajectory, while each of facies 404M, 404O, 404S, 404C, 404P, and 404OG is shown with a respective log track as a respective probability log 1300 showing the facies probabilities as a log curve generated from the facies input data of the first overall log track. FIG. 14 illustrates a 3D probability trend 1400 shown as a North-South (N-S) section based on the probability log 1300 of FIG. 13 for a specific facies 404C of Cladocoropsis with respect to the plurality of sequences 300. The 3D facies model processor 104 may be operable to execute machine-readable instructions of the model generator component 112 to generate a plurality of 3D probability trends 1400 for the plurality of facies 404, each 3D probability trend 1400 associated with respective facies of the plurality of facies 404 based on the facies volume fraction for the respective facies. In embodiments, the plurality of 3D probability trends 1400 may be generated for each sequence facies of the at least one facies 404 for each sequence of the plurality of sequences 300.

The plurality of 3D probability trends 1400 for the plurality of facies 404 may be generated based on a plurality of probability logs 1300, each facies of the plurality of facies 404 associated with a respective probability log of the plurality of probability logs 1300, such as show in FIG. 13. The 3D stratigraphic sequence framework 299 may be generated comprising a plurality of sequences 300 based on the one or more sequences of strata of the sequence stratigraphy, wherein each sequence of the plurality of sequences comprises at least one facies from the plurality of facies 404 for the subject reservoir, and each 3D probability trend 1400 may be generated for each facies 404 of each sequence 301, 302, 303 of the plurality of sequences 300 based on the respective probability log 1300 for the facies 404 for each sequence 301, 302, 303 of the plurality of sequences 300. The probability log 1300 for each facies 404 may be modeled in 3D using kriging testing different connectivity ranges guided by variogram analysis for sensitivity. Vertical proportion curve and two-dimensional (2D) trend maps for each stratigraphic interval may be used as additional inputs to the 3D probability trend 1400.

In block 218 of the process 200 of FIG. 2, the 3D probability trend for each facies at each stratigraphic interval may be checked for accuracy (e.g., through a QC process) and additional constraints may be added to improve the model such as 2D trend maps for each stratigraphic interval.

In block 220 of the process 200 of FIG. 2, the 3D conceptual facies model may be run based on facies modeling algorithms and guided by the generated 3D probability trends 1400. The modeling algorithms may be object based or pixel based depending on facies geometrical data availability. By way of example, and not as a limitation, an object based modeling algorithm may be used if geo-bodies geometry and dimensions are available, and a pixel based modeling algorithm may be used otherwise. FIG. 15 illustrates a 3D facies model 1500 generated via the process 200 of FIG. 2 and the 3D facies model generator system 100 of FIG. 1 using a pixel based modeling algorithm to distribute facies in 3D guided by generated trends for each facies as described herein. The 3D facies model processor 104 may be operable to execute machine-readable instructions of the model generator component 112 to generate the 3D facies model 1500 based on the plurality of 3D probability trends 1400 for the plurality of facies 404. The 3D facies model processor 104 may be further operable to execute machine-readable instructions of the model generator component 112 to generate the 3D facies model 1500 based on the plurality of 3D probability trends 1400 for the plurality of facies 404 using a modeling algorithm, wherein the modeling algorithm is one of object based or pixel based. Comparison of the 3D facies model 1500 with the depositional model 700 finds a success and sufficient close results and that the vertical stacking and shallowing/coursing upward cycles of the subject reservoir are captured such as the depositional events are successfully reflected in the 3D facies model 1500.

Aspects Listing

Aspect 1. A three-dimensional (3D) facies model generator system comprising a 3D facies model memory comprising a model generator component and a facies data repository and a 3D facies model processor. The facies data repository comprises (i) facies data for a subject reservoir comprising strata defining a sequence stratigraphy comprising one or more sequences of strata, each sequence of the sequence stratigraphy comprising one or more facies, (ii) the sequence stratigraphy for a total strata of the subject reservoir, and (iii) a depositional model for the subject reservoir based on the sequence stratigraphy. The facies data comprises a plurality of depositional inputs for the subject reservoir, and the sequence stratigraphy comprises the one or more sequences of strata for the total strata of the subject reservoir. The 3D facies model processor is communicatively coupled to the 3D facies model memory and operable to execute machine-readable instructions of the model generator component to receive, from the facies data repository, (i) the facies data comprising the plurality of depositional inputs for the subject reservoir and (ii) the sequence stratigraphy comprising the one or more sequences of strata for the subject reservoir, generate a 3D stratigraphic sequence framework comprising a plurality of facies for the subject reservoir based on the facies data and the sequence stratigraphy, and generate a facies volume fraction for each facies of the plurality of facies. The 3D facies model processor is further operable to execute machine-readable instructions of the model generator component to compare each facies volume fraction for each facies of the plurality of facies with the depositional model for the subject reservoir to determine whether a facies of the 3D stratigraphic sequence framework is correctly assigned based on a comparison with the depositional model, and reassign the facies volume fraction for the facies of the plurality of facies to another facies of the plurality of facies when the comparison determines that the facies of the 3D stratigraphic sequence framework is incorrectly assigned. The 3D facies model processor is further operable to execute machine-readable instructions of the model generator component to generate a plurality of 3D probability trends for the plurality of facies, each 3D probability trend associated with respective facies of the plurality of facies based on the facies volume fraction for the respective facies, and generate the 3D facies model based on the plurality of 3D probability trends for the plurality of facies Aspect 2. The 3D facies model generator system of Aspect 1, wherein the 3D facies model processor is further operable to execute machine-readable instructions of the model generator component to display the facies volume fraction for each facies in a pie chart.

Aspect 3. The 3D facies model generator system of Aspect 1 or Aspect 2, wherein the 3D facies model processor is further operable to execute machine-readable instructions of the model generator component to generate the 3D stratigraphic sequence framework comprising a plurality of sequences based on the one or more sequences of strata of the sequence stratigraphy, wherein each sequence of the plurality of sequences comprises at least one facies from the plurality of facies for the subject reservoir, and generate the facies volume fraction for each facies of each sequence of the plurality of sequences.

Aspect 4. The 3D facies model generator system of Aspect 3. wherein the 3D facies model processor is further operable to execute machine-readable instructions of the model generator component to compare each facies volume fraction for each facies of the at least one facies for each sequence of the plurality of sequences of the 3D stratigraphic sequence framework with the depositional model for the subject reservoir to determine whether a sequence facies for a sequence of the 3D stratigraphic sequence framework is correctly assigned based on the comparison with the depositional model, reassign the facies volume fraction for the sequence facies of the sequence of the plurality of sequences to another sequence facies of the at least one facies of the sequence when the comparison determines that the sequence facies of the 3D stratigraphic sequence framework is incorrectly assigned, and generate the plurality of 3D probability trends for each sequence facies of the at least one facies for each sequence of the plurality of sequences.

Aspect 5. The 3D facies model generator system of any of Aspect 1 to Aspect 4, wherein the 3D facies model processor is further operable to execute machine-readable instructions of the model generator component to display the facies volume fraction for each facies of a sequence of the plurality of sequences in a sequence pie chart.

Aspect 6. The 3D facies model generator system of any of Aspect 1 to Aspect 5, wherein the 3D facies model processor is further operable to execute machine-readable instructions of the model generator component to upscale the facies data from well log data of one or more wells of the subject reservoir to assign to upscaled cells to display in a grid model, and display the upscaled cells in the grid model against the well log data for the one or more wells.

Aspect 7. The 3D facies model generator system of Aspect 6, wherein the 3D facies model processor is further operable to execute machine-readable instructions of the model generator component to display the upscaled cells in the grid model against the well log data for the one or more wells for each sequence of the one or more sequences of strata for the subject reservoir.

Aspect 8. The 3D facies model generator system of any of Aspect 1 to Aspect 7, wherein the 3D facies model processor is further operable to execute machine-readable instructions of the model generator component to generate a minimum thickness, a maximum thickness, and a volume fraction for each facies of the plurality of facies based on the sequence stratigraphy.

Aspect 9. The 3D facies model generator system of Aspect 8, wherein the 3D facies model processor is further operable to execute machine-readable instructions of the model generator component to display the minimum thickness, the maximum thickness, and the volume fraction for each facies of the plurality of facies.

Aspect 10. The 3D facies model generator system of any of Aspect 1 to Aspect 9, wherein the 3D facies model processor is further operable to execute machine-readable instructions of the model generator component to generate the 3D stratigraphic sequence framework comprising a plurality of sequences based on the one or more sequences of strata of the sequence stratigraphy, wherein each sequence of the plurality of sequences comprises at least one facies from the plurality of facies for the subject reservoir, and generate a minimum thickness, a maximum thickness, and a volume fraction for each facies of the plurality of facies for each of the plurality of sequences.

Aspect 11. The 3D facies model generator system of Aspect 10, wherein the 3D facies model processor is further operable to execute machine-readable instructions of the model generator component to display the minimum thickness, the maximum thickness, and the volume fraction for each facies of the plurality of facies for at least one of the plurality of sequences.

Aspect 12. The 3D facies model generator system of any of Aspect 1 to Aspect 11, wherein the 3D facies model processor is further operable to execute machine-readable instructions of the model generator component to generate the 3D facies model based on the plurality of 3D probability trends for the plurality of facies using a modeling algorithm, wherein the modeling algorithm is one of object based or pixel based.

Aspect 13. The 3D facies model generator system of any of Aspect 1 to Aspect 12, wherein the 3D facies model processor is further operable to execute machine-readable instructions of the model generator component to generate the plurality of 3D probability trends for the plurality of facies based on a plurality of probability logs, each facies of the plurality of facies associated with a respective probability log of the plurality of probability logs.

Aspect 14. The 3D facies model generator system of Aspect 13, wherein the 3D facies model processor is further operable to execute machine-readable instructions of the model generator component to generate the 3D stratigraphic sequence framework comprising a plurality of sequences based on the one or more sequences of strata of the sequence stratigraphy, wherein each sequence of the plurality of sequences comprises at least one facies from the plurality of facies for the subject reservoir, and generate each 3D probability trend for each facies of each sequence of the plurality of sequences based on the respective probability log for the facies for each sequence of the plurality of sequences.

Aspect 15. The 3D facies model generator system of any of Aspect 1 to Aspect 14, each of the one or more facies comprising a specific facies identification representative of a body of rock with specific unique characteristics associated with the specific facies identification representative of the body of rock.

Aspect 16. A three-dimensional (3D) facies model generator system comprising a 3D facies model memory comprising a model generator component and a facies data repository and a 3D facies model processor communicatively coupled to the 3D facies model memory and operable to execute machine-readable instructions of the model generator component. The facies data repository comprises (i) facies data for a subject reservoir comprising strata defining a sequence stratigraphy comprising one or more sequences of strata, each sequence of the sequence stratigraphy comprising one or more facies, (ii) the sequence stratigraphy for a total strata of the subject reservoir, and (iii) a depositional model for the subject reservoir based on the sequence stratigraphy. The facies data comprises a plurality of depositional inputs for the subject reservoir, and the sequence stratigraphy comprises the one or more sequences of strata for the total strata of the subject reservoir. The 3D facies model processor is operable to execute machine-readable instructions of the model generator component to receive, from the facies data repository, (i) the facies data comprising the plurality of depositional inputs for the subject reservoir and (ii) the sequence stratigraphy comprising the one or more sequences of strata for the subject reservoir, generate a 3D stratigraphic sequence framework comprising a plurality of facies for the subject reservoir based on the facies data and the sequence stratigraphy, and generate a facies volume fraction for each facies of the plurality of facies. The 3D facies model processor is further operable to execute machine-readable instructions of the model generator component to compare each facies volume fraction for each facies of the plurality of facies with the depositional model for the subject reservoir to determine whether a facies of the 3D stratigraphic sequence framework is correctly assigned based on a comparison with the depositional model, and reassign the facies volume fraction for the facies of the plurality of facies to another facies of the plurality of facies when the comparison determines that the facies of the 3D stratigraphic sequence framework is incorrectly assigned. The 3D facies model processor is further operable to execute machine-readable instructions of the model generator component to generate a plurality of 3D probability trends for the plurality of facies based on a plurality of probability logs, each 3D probability trend associated with a respective facies of the plurality of facies based on the facies volume fraction for the respective facies, each facies of the plurality of facies associated with a respective probability log of the plurality of probability logs, and generate the 3D facies model based on the plurality of 3D probability trends for the plurality of facies using a modeling algorithm, wherein the modeling algorithm is one of object based or pixel based.

Aspect 17. The 3D facies model generator system of Aspect 16, wherein the 3D facies model processor is further operable to execute machine-readable instructions of the model generator component to generate the 3D stratigraphic sequence framework comprising a plurality of sequences based on the one or more sequences of strata of the sequence stratigraphy, wherein each sequence of the plurality of sequences comprises at least one facies from the plurality of facies for the subject reservoir, and generate each 3D probability trend for each facies of each sequence of the plurality of sequences based on the respective probability log for the facies for each sequence of the plurality of sequences.

Aspect 18. The 3D facies model generator system of Aspect 16 or Aspect 17, wherein the 3D facies model processor is further operable to execute machine-readable instructions of the model generator component to upscale the facies data from well log data of one or more wells of the subject reservoir to assign to upscaled cells to display in a grid model, and display the upscaled cells in the grid model against the well log data for the one or more wells.

Aspect 19. The 3D facies model generator system of any of Aspect 16 to Aspect 18, wherein the 3D facies model processor is further operable to execute machine-readable instructions of the model generator component to generate a minimum thickness, a maximum thickness, and a volume fraction for each facies of the plurality of facies based on the sequence stratigraphy.

Aspect 20. A method of generating a three-dimensional (3D) facies model comprises receiving, from a facies data repository, (i) facies data comprising a plurality of depositional inputs for a subject reservoir, the facies data for the subject reservoir comprising strata defining a sequence stratigraphy comprising one or more sequences of strata, each sequence of the sequence stratigraphy comprising one or more facies, (ii) the sequence stratigraphy comprising the one or more sequences of strata for the subject reservoir, and (iii) the sequence stratigraphy for a total strata of the subject reservoir. The method further comprises generating a 3D stratigraphic sequence framework comprising a plurality of facies for the subject reservoir based on the facies data and the sequence stratigraphy, generating a facies volume fraction for each facies of the plurality of facies, comparing each facies volume fraction for each facies of the plurality of facies with a depositional model of the facies data repository for the subject reservoir and based on the sequence stratigraphy to determine whether a facies of the 3D stratigraphic sequence framework is correctly assigned based on a comparison with the depositional model, and reassigning the facies volume fraction for the facies of the plurality of facies to another facies of the plurality of facies when the comparison determines that the facies of the 3D stratigraphic sequence framework is incorrectly assigned. The method further comprises generating a plurality of 3D probability trends for the plurality of facies, each 3D probability trend associated with a respective facies of the plurality of facies based on the facies volume fraction for the respective facies, and generating the 3D facies model based on the plurality of 3D probability trends for the plurality of facies.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present disclosure, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A three-dimensional (3D) facies model generator system comprising:
a 3D facies model memory comprising a model generator component and a facies data repository, the facies data repository comprising
(i) facies data for a subject reservoir comprising strata defining a sequence stratigraphy comprising one or more sequences of strata, each sequence of the sequence stratigraphy comprising one or more facies,
(ii) the sequence stratigraphy for a total strata of the subject reservoir, and
(iii) a depositional model for the subject reservoir based on the sequence stratigraphy,
the facies data comprising a plurality of depositional inputs for the subject reservoir, and
the sequence stratigraphy comprising the one or more sequences of strata for the total strata of the subject reservoir; and
a 3D facies model processor communicatively coupled to the 3D facies model memory and operable to execute machine-readable instructions of the model generator component to
receive, from the facies data repository, (i) the facies data comprising the plurality of depositional inputs for the subject reservoir and (ii) the sequence stratigraphy comprising the one or more sequences of strata for the subject reservoir,
generate a 3D stratigraphic sequence framework comprising a plurality of facies for the subject reservoir based on the facies data and the sequence stratigraphy, generate a facies volume fraction for each facies of the plurality of facies, compare each facies volume fraction for each facies of the plurality of facies with the depositional model for the subject reservoir to determine whether a facies of the 3D stratigraphic sequence framework is correctly assigned based on a comparison with the depositional model, reassign the facies volume fraction for the facies of the plurality of facies to another facies of the plurality of facies when the comparison determines that the facies of the 3D stratigraphic sequence framework is incorrectly assigned, generate a plurality of 3D probability trends for the plurality of facies, each 3D probability trend associated with respective facies of the plurality of facies based on the facies volume fraction for the respective facies, and generate the 3D facies model based on the plurality of 3D probability trends for the plurality of facies.

2. The 3D facies model generator system of claim 1, wherein the 3D facies model processor is further operable to execute machine-readable instructions of the model generator component to display the facies volume fraction for each facies in a pie chart.

3. The 3D facies model generator system of claim 1, wherein the 3D facies model processor is further operable to execute machine-readable instructions of the model generator component to generate the 3D stratigraphic sequence framework comprising a plurality of sequences based on the one or more sequences of strata of the sequence stratigraphy, wherein each sequence of the plurality of sequences comprises at least one facies from the plurality of facies for the subject reservoir; and generate the facies volume fraction for each facies of each sequence of the plurality of sequences.

4. The 3D facies model generator system of claim 3, wherein the 3D facies model processor is further operable to execute machine-readable instructions of the model generator component to compare each facies volume fraction for each facies of the at least one facies for each sequence of the plurality of sequences of the 3D stratigraphic sequence framework with the depositional model for the subject reservoir to determine whether a sequence facies for a sequence of the 3D stratigraphic sequence framework is correctly assigned based on the comparison with the depositional model;

reassign the facies volume fraction for the sequence facies of the sequence of the plurality of sequences to another sequence facies of the at least one facies of the sequence when the comparison determines that the sequence facies of the 3D stratigraphic sequence framework is incorrectly assigned; and generate the plurality of 3D probability trends for each sequence facies of the at least one facies for each sequence of the plurality of sequences.

5. The 3D facies model generator system of claim 1, wherein the 3D facies model processor is further operable to execute machine-readable instructions of the model generator component to display the facies volume fraction for each facies of a sequence of the plurality of sequences in a sequence pie chart.

6. The 3D facies model generator system of claim 1, wherein the 3D facies model processor is further operable to execute machine-readable instructions of the model generator component to upscale the facies data from well log data of one or more wells of the subject reservoir to assign to upscaled cells to display in a grid model; and display the upscaled cells in the grid model against the well log data for the one or more wells.

7. The 3D facies model generator system of claim 6, wherein the 3D facies model processor is further operable to execute machine-readable instructions of the model generator component to display the upscaled cells in the grid model against the well log data for the one or more wells for each sequence of the one or more sequences of strata for the subject reservoir.

8. The 3D facies model generator system of claim 1, wherein the 3D facies model processor is further operable to execute machine-readable instructions of the model generator component to generate a minimum thickness, a maximum thickness, and a volume fraction for each facies of the plurality of facies based on the sequence stratigraphy.

9. The 3D facies model generator system of claim 8, wherein the 3D facies model processor is further operable to execute machine-readable instructions of the model generator component to display the minimum thickness, the maximum thickness, and the volume fraction for each facies of the plurality of facies.

10. The 3D facies model generator system of claim 1, wherein the 3D facies model processor is further operable to execute machine-readable instructions of the model generator component to generate the 3D stratigraphic sequence framework comprising a plurality of sequences based on the one or more sequences of strata of the sequence stratigraphy, wherein each sequence of the plurality of sequences comprises at least one facies from the plurality of facies for the subject reservoir; and generate a minimum thickness, a maximum thickness, and a volume fraction for each facies of the plurality of facies for each of the plurality of sequences.

11. The 3D facies model generator system of claim 10, wherein the 3D facies model processor is further operable to execute machine-readable instructions of the model generator component to display the minimum thickness, the maximum thickness, and the volume fraction for each facies of the plurality of facies for at least one of the plurality of sequences.

12. The 3D facies model generator system of claim 1, wherein the 3D facies model processor is further operable to execute machine-readable instructions of the model generator component to generate the 3D facies model based on the plurality of 3D probability trends for the plurality of facies using a modeling algorithm, wherein the modeling algorithm is one of object based or pixel based.

13. The 3D facies model generator system of claim 1, wherein the 3D facies model processor is further operable to execute machine-readable instructions of the model generator component to generate the plurality of 3D probability trends for the plurality of facies based on a plurality of probability logs, each facies of the plurality of facies associated with a respective probability log of the plurality of probability logs.

14. The 3D facies model generator system of claim 13, wherein the 3D facies model processor is further operable to execute machine-readable instructions of the model generator component to
   generate the 3D stratigraphic sequence framework comprising a plurality of sequences based on the one or more sequences of strata of the sequence stratigraphy, wherein each sequence of the plurality of sequences comprises at least one facies from the plurality of facies for the subject reservoir; and
   generate each 3D probability trend for each facies of each sequence of the plurality of sequences based on the respective probability log for the facies for each sequence of the plurality of sequences.

15. The 3D facies model generator system of claim 1, each of the one or more facies comprising a specific facies identification representative of a body of rock with specific unique characteristics associated with the specific facies identification representative of the body of rock.

16. A three-dimensional (3D) facies model generator system comprising:
   a 3D facies model memory comprising a model generator component and a facies data repository, the facies data repository comprising
      (i) facies data for a subject reservoir comprising strata defining a sequence stratigraphy comprising one or more sequences of strata, each sequence of the sequence stratigraphy comprising one or more facies,
      (ii) the sequence stratigraphy for a total strata of the subject reservoir, and
      (iii) a depositional model for the subject reservoir based on the sequence stratigraphy,
      the facies data comprising a plurality of depositional inputs for the subject reservoir, and
      the sequence stratigraphy comprising the one or more sequences of strata for the total strata of the subject reservoir; and
   a 3D facies model processor communicatively coupled to the 3D facies model memory and operable to execute machine-readable instructions of the model generator component to
      receive, from the facies data repository, (i) the facies data comprising the plurality of depositional inputs for the subject reservoir and (ii) the sequence stratigraphy comprising the one or more sequences of strata for the subject reservoir,
      generate a 3D stratigraphic sequence framework comprising a plurality of facies for the subject reservoir based on the facies data and the sequence stratigraphy,
      generate a facies volume fraction for each facies of the plurality of facies,
      compare each facies volume fraction for each facies of the plurality of facies with the depositional model for the subject reservoir to determine whether a facies of the 3D stratigraphic sequence framework is correctly assigned based on a comparison with the depositional model,
      reassign the facies volume fraction for the facies of the plurality of facies to another facies of the plurality of facies when the comparison determines that the facies of the 3D stratigraphic sequence framework is incorrectly assigned,
      generate a plurality of 3D probability trends for the plurality of facies based on a plurality of probability logs, each 3D probability trend associated with a respective facies of the plurality of facies based on the facies volume fraction for the respective facies, each facies of the plurality of facies associated with a respective probability log of the plurality of probability logs, and
      generate the 3D facies model based on the plurality of 3D probability trends for the plurality of facies using a modeling algorithm, wherein the modeling algorithm is one of object based or pixel based.

17. The 3D facies model generator system of claim 16, wherein the 3D facies model processor is further operable to execute machine-readable instructions of the model generator component to
   generate the 3D stratigraphic sequence framework comprising a plurality of sequences based on the one or more sequences of strata of the sequence stratigraphy, wherein each sequence of the plurality of sequences comprises at least one facies from the plurality of facies for the subject reservoir; and
   generate each 3D probability trend for each facies of each sequence of the plurality of sequences based on the respective probability log for the facies for each sequence of the plurality of sequences.

18. The 3D facies model generator system of claim 16, wherein the 3D facies model processor is further operable to execute machine-readable instructions of the model generator component to
   upscale the facies data from well log data of one or more wells of the subject reservoir to assign to upscaled cells to display in a grid model; and
   display the upscaled cells in the grid model against the well log data for the one or more wells.

19. The 3D facies model generator system of claim 16, wherein the 3D facies model processor is further operable to execute machine-readable instructions of the model generator component to
   generate a minimum thickness, a maximum thickness, and a volume fraction for each facies of the plurality of facies based on the sequence stratigraphy.

20. A method of generating a three-dimensional (3D) facies model comprising:
   receiving, from a facies data repository, (i) facies data comprising a plurality of depositional inputs for a subject reservoir, the facies data for the subject reservoir comprising strata defining a sequence stratigraphy comprising one or more sequences of strata, each sequence of the sequence stratigraphy comprising one or more facies, (ii) the sequence stratigraphy comprising the one or more sequences of strata for the subject reservoir, and (iii) the sequence stratigraphy for a total strata of the subject reservoir,
   generating a 3D stratigraphic sequence framework comprising a plurality of facies for the subject reservoir based on the facies data and the sequence stratigraphy,
   generating a facies volume fraction for each facies of the plurality of facies,
   comparing each facies volume fraction for each facies of the plurality of facies with a depositional model of the facies data repository for the subject reservoir and based on the sequence stratigraphy to determine whether a facies of the 3D stratigraphic sequence framework is correctly assigned based on a comparison with the depositional model, reassigning the facies volume fraction for the facies of the plurality of facies to another facies of the plurality of facies when the comparison determines that the facies of the 3D stratigraphic sequence framework is incorrectly assigned, generating a plurality of 3D probability trends for the plurality of facies, each 3D probability trend associated with a respective facies of the plurality of facies based on the facies volume fraction for the respective facies, and generating the 3D facies model based on the plurality of 3D probability trends for the plurality of facies.

* * * * *